US011245901B2

(12) United States Patent
    Fuchikami

(10) Patent No.: US 11,245,901 B2
(45) Date of Patent: Feb. 8, 2022

(54) VIDEO SIGNAL PROCESSING DEVICE, VIDEO DISPLAY SYSTEM, AND VIDEO SIGNAL PROCESSING METHOD

(71) Applicant: PANASONIC INTELLECTUAL PROPERTY MANAGEMENT CO., LTD., Osaka (JP)

(72) Inventor: Ryuji Fuchikami, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/652,841

(22) PCT Filed: Sep. 26, 2018

(86) PCT No.: PCT/JP2018/035562
    § 371 (c)(1),
    (2) Date: Apr. 1, 2020

(87) PCT Pub. No.: WO2019/069753
    PCT Pub. Date: Apr. 11, 2019

(65) Prior Publication Data
    US 2020/0314427 A1    Oct. 1, 2020

(30) Foreign Application Priority Data

Oct. 4, 2017 (JP) .............................. JP2017-194022
Feb. 7, 2018 (JP) .............................. JP2018-020309

(51) Int. Cl.
    *H04N 19/124* (2014.01)
    *H04N 19/126* (2014.01)
    (Continued)

(52) U.S. Cl.
    CPC ......... *H04N 19/124* (2014.11); *H04N 19/139* (2014.11); *H04N 19/172* (2014.11)

(58) Field of Classification Search
    None
    See application file for complete search history.

(56) References Cited

U.S. PATENT DOCUMENTS 3,462,686 A * 8/1969 Shutterly .............. H03M 3/456
                                                    375/248
4,411,001 A   10/1983 Van Buul et al.
               (Continued)

FOREIGN PATENT DOCUMENTS

JP    2008-219484    9/2008

OTHER PUBLICATIONS

International Search Report (ISR) from International Searching Authority (Japan Patent Office) in International Pat. Appl. No. PCT/JP2018/035562, dated Nov. 20, 2018.

*Primary Examiner* — Samuel D Fereja
(74) *Attorney, Agent, or Firm* — Greenblum & Bernstein, P.L.C.

(57) ABSTRACT

A video signal processing device is configured to include a quantizer that sequentially outputs quantized data obtained by quantizing input data based on the video data of the first gradation into the video data of the second gradation, a storage that sequentially stores the quantized data output from the quantizer, a difference calculator that sequentially calculates differences between the video data of the first gradation for a current frame and the quantized data for a previous frame stored in the storage, and an integrator that sequentially outputs integral data obtained by sequentially integrating data output from the difference calculator as the input data of the quantizer.

10 Claims, 18 Drawing Sheets

| TIME | GRADATION VALUE OF VIDEO DATA | | | | | | | | | | | | | | | | | | | | | | | | |
|---|---|---|---|---|---|---|---|---|---|---|---|---|---|---|---|---|---|---|---|---|---|---|---|---|---|
| | 0 | | 1 | | 2 | | 3 | | ... | 10 | | 11 | | 12 | | ... | 238 | | 239 | | 240 | | | | |
| | OUTPUT | INTEGRAL VALUE | OUTPUT | INTEGRAL VALUE | OUTPUT | INTEGRAL VALUE | OUTPUT | INTEGRAL VALUE | | OUTPUT | INTEGRAL VALUE | OUTPUT | INTEGRAL VALUE | OUTPUT | INTEGRAL VALUE | | OUTPUT | INTEGRAL VALUE | OUTPUT | INTEGRAL VALUE | OUTPUT | INTEGRAL VALUE | | | |
| INITIAL VALUE | 0 | 0 | 0 | 0 | 0 | 0 | 0 | 0 | | 0 | 0 | 0 | 0 | 0 | 0 | | 14 | 0 | 14 | 0 | 15 | 0 | | | |
| t0 | 0 | 0 | 0 | 1 | 0 | 2 | 0 | 3 | | 0 | 10 | 0 | 11 | 0 | 12 | | 14 | 14 | 14 | 15 | 15 | 0 | | | |
| t1 | 0 | 0 | 0 | 2 | 0 | 4 | 0 | 6 | | 1 | 20 | 1 | 22 | 1 | 24 | | 15 | 28 | 15 | 30 | 15 | 0 | | | |
| t2 | 0 | 0 | 0 | 3 | 0 | 6 | 0 | 9 | | 1 | 14 | 2 | 17 | 2 | 20 | | 16 | 26 | 16 | 29 | 15 | 0 | | | |
| t3 | 0 | 0 | 0 | 4 | 0 | 8 | 0 | 12 | | 1 | 8 | 1 | -4 | 2 | 0 | | 16 | 8 | 16 | 12 | 15 | 0 | | | |
| t4 | 0 | 0 | 0 | 5 | 0 | 10 | 0 | 15 | | 1 | 2 | 0 | -9 | 0 | -20 | | 15 | -10 | 15 | -5 | 15 | 0 | | | |
| t5 | 0 | 0 | 0 | 6 | 0 | 12 | 1 | 18 | | 0 | -4 | 0 | 2 | -1 | -8 | | 14 | -12 | 14 | -6 | 15 | 0 | | | |
| t6 | 0 | 0 | 0 | 7 | 0 | 14 | 1 | 5 | | 0 | 6 | 0 | 13 | 0 | 20 | | 14 | 2 | 14 | 9 | 15 | 0 | | | |
| t7 | 0 | 0 | 0 | 8 | 1 | 16 | 0 | -8 | | 1 | 16 | 1 | 24 | 2 | 32 | | 15 | 16 | 15 | 24 | 15 | 0 | | | |
| t8 | 0 | 0 | 0 | 9 | 1 | 2 | -1 | -5 | | 1 | 10 | 2 | 19 | 2 | 12 | | 15 | 14 | 16 | 23 | 15 | 0 | | | |
| t9 | 0 | 0 | 0 | 10 | 0 | -12 | -1 | 14 | | 1 | 4 | 1 | -2 | 1 | -8 | | 15 | 12 | 16 | 6 | 15 | 0 | | | |
| t10 | 0 | 0 | 0 | 11 | -1 | -10 | 1 | 33 | | 0 | -2 | 0 | -7 | 0 | -12 | | 15 | 10 | 15 | -11 | 15 | 0 | | | |
| t11 | 0 | 0 | 0 | 12 | -1 | 8 | 2 | 20 | | 0 | 8 | 0 | 4 | 0 | 0 | | 15 | 8 | 14 | -12 | 15 | 0 | | | |
| t12 | 0 | 0 | 0 | 13 | 0 | 26 | 1 | -9 | | 1 | 18 | 0 | 15 | 0 | 12 | | 15 | 6 | 14 | 3 | 15 | 0 | | | |
| t13 | 0 | 0 | 0 | 14 | 1 | 28 | -1 | -22 | | 1 | 12 | 1 | 26 | 1 | 24 | | 15 | 4 | 15 | 18 | 15 | 0 | | | |
| t14 | 0 | 0 | 0 | 15 | 1 | 14 | -2 | -3 | | 1 | 6 | 2 | 21 | 2 | 20 | | 15 | 2 | 16 | 17 | 15 | 0 | | | |
| t15 | 0 | 0 | 1 | 16 | 1 | 0 | 0 | 32 | | 1 | 0 | 2 | 0 | 2 | 0 | | 15 | 0 | 16 | 0 | 15 | 0 | | | |
| 16 TIMES AVERAGE VALUE (INVERSE QUANTIZATION) | 0 | | 0 | | 2 | | 1 | | | 10 | | 11 | | 12 | | | 238 | | 239 | | 240 | | | | |

(51) Int. Cl.
*H04N 19/172* (2014.01)
*H04N 19/139* (2014.01)

(56) References Cited

U.S. PATENT DOCUMENTS

| | | | | |
|---|---|---|---|---|
| 2012/0183079 | A1* | 7/2012 | Yoshimatsu | H04N 19/70 375/240.25 |
| 2014/0056577 | A1* | 2/2014 | Ogawa | G11B 20/10527 386/329 |
| 2015/0229941 | A1* | 8/2015 | Nakano | H04N 19/169 375/240.26 |
| 2016/0098849 | A1* | 4/2016 | Shintani | G09B 21/009 345/634 |
| 2019/0304410 | A1* | 10/2019 | Ogaki | G06F 17/18 |

* cited by examiner

FIG. 4

| TIME | \multicolumn{2}{c|}{0} | \multicolumn{2}{c|}{1} | \multicolumn{2}{c|}{2} | \multicolumn{2}{c|}{3} | ... | \multicolumn{2}{c|}{10} | \multicolumn{2}{c|}{11} | \multicolumn{2}{c|}{12} | ... | \multicolumn{2}{c|}{238} | \multicolumn{2}{c|}{239} | \multicolumn{2}{c|}{240} |
|---|---|---|---|---|---|---|---|---|---|---|---|---|---|---|---|---|---|---|---|---|---|
| | OUTPUT | INTEGRAL VALUE | OUTPUT | INTEGRAL VALUE | OUTPUT | INTEGRAL VALUE | OUTPUT | INTEGRAL VALUE | | OUTPUT | INTEGRAL VALUE | OUTPUT | INTEGRAL VALUE | OUTPUT | INTEGRAL VALUE | | OUTPUT | INTEGRAL VALUE | OUTPUT | INTEGRAL VALUE | OUTPUT | INTEGRAL VALUE |
| INITIAL VALUE | 0 | 0 | 0 | 0 | 0 | 0 | 0 | 0 | | 0 | 0 | 0 | 0 | 0 | 0 | | 0 | 0 | 0 | 0 | 0 | 0 |
| t0 | 0 | 0 | 0 | 1 | 0 | 2 | 0 | 3 | | 0 | 10 | 0 | 11 | 0 | 12 | | 14 | 14 | 14 | 14 | 15 | 15 |
| t1 | 0 | 0 | 0 | 2 | 0 | 4 | 0 | 6 | | 1 | 20 | 1 | 22 | 1 | 24 | | 15 | 28 | 15 | 30 | 15 | 15 |
| t2 | 0 | 0 | 0 | 3 | 0 | 6 | 0 | 9 | | 1 | 14 | 2 | 17 | 2 | 20 | | 16 | 26 | 16 | 29 | 15 | 15 |
| t3 | 0 | 0 | 0 | 4 | 0 | 8 | 0 | 12 | | 1 | 8 | 1 | -4 | 2 | 0 | | 16 | 8 | 16 | 12 | 15 | 15 |
| t4 | 0 | 0 | 0 | 5 | 0 | 10 | 0 | 15 | | 1 | 2 | 0 | -9 | 0 | -20 | | 15 | -10 | 15 | -5 | 15 | 15 |
| t5 | 0 | 0 | 0 | 6 | 0 | 12 | 1 | 18 | | 0 | -4 | 0 | 2 | -1 | -8 | | 14 | -12 | 14 | -6 | 15 | 15 |
| t6 | 0 | 0 | 0 | 7 | 0 | 14 | 1 | 5 | | 0 | 6 | 0 | 13 | 0 | 20 | | 14 | 2 | 14 | 9 | 15 | 15 |
| t7 | 0 | 0 | 0 | 8 | 1 | 16 | 0 | -8 | | 1 | 16 | 1 | 24 | 2 | 32 | | 15 | 16 | 15 | 24 | 15 | 15 |
| t8 | 0 | 0 | 0 | 9 | 1 | 2 | -1 | -5 | | 1 | 10 | 2 | 19 | 2 | 12 | | 15 | 14 | 16 | 23 | 15 | 15 |
| t9 | 0 | 0 | 0 | 10 | 0 | -12 | -1 | 14 | | 1 | 4 | 1 | -2 | 1 | -8 | | 15 | 12 | 16 | 6 | 15 | 15 |
| t10 | 0 | 0 | 0 | 11 | -1 | -10 | 1 | 33 | | 0 | -2 | 0 | -7 | 0 | -12 | | 15 | 10 | 15 | -11 | 15 | 15 |
| t11 | 0 | 0 | 0 | 12 | -1 | 8 | 2 | 20 | | 0 | 8 | 0 | 4 | 0 | 0 | | 15 | 8 | 14 | -12 | 15 | 15 |
| t12 | 0 | 0 | 0 | 13 | 0 | 26 | 1 | -9 | | 1 | 18 | 1 | 15 | 0 | 12 | | 15 | 6 | 14 | 3 | 15 | 15 |
| t13 | 0 | 0 | 0 | 14 | 1 | 28 | -1 | -22 | | 1 | 12 | 1 | 26 | 1 | 24 | | 15 | 4 | 15 | 18 | 15 | 15 |
| t14 | 0 | 0 | 0 | 15 | 1 | 14 | -2 | -3 | | 1 | 6 | 2 | 21 | 2 | 20 | | 15 | 2 | 16 | 17 | 15 | 15 |
| t15 | 0 | 0 | 1 | 16 | 1 | 0 | 0 | 32 | | 1 | 0 | 2 | 0 | 2 | 0 | | 15 | 0 | 16 | 0 | 15 | 0 |
| 16 TIMES AVERAGE VALUE (INVERSE QUANTIZATION) | 0 | | 0 | | 2 | | 1 | | | 10 | | 11 | | 12 | | | 238 | | 239 | | 240 | |

GRADATION VALUE OF VIDEO DATA

FIG. 8

| FRAME No. | GRADATION VALUE OF VIDEO DATA | INTEGRAL VALUE | OUTPUT VALUE OF TRANSMITTER | LUMINANCE VALUE OF DISPLAY DEVICE |
|---|---|---|---|---|
| 0 | 0 | 0 | 0 | 0 |
| 1 | 8 | 0 | 7 | 7 |
| 2 | 9 | 7 | 2 | 9 |
| 3 | 10 | 9 | 1 | 10 |
| 4 | 12 | 10 | 2 | 12 |
| 5 | 14 | 12 | 2 | 14 |
| 6 | 17 | 14 | 3 | 17 |
| 7 | 20 | 17 | 3 | 20 |
| 8 | 24 | 20 | 4 | 24 |
| 9 | 28 | 24 | 4 | 28 |
| 10 | 33 | 28 | 5 | 33 |
| ⋮ | ⋮ | ⋮ | ⋮ | ⋮ |
| 40 | 234 | 230 | 4 | 234 |
| 41 | 238 | 234 | 4 | 238 |
| 42 | 241 | 238 | 3 | 241 |
| 43 | 243 | 241 | 2 | 243 |
| 44 | 245 | 243 | 2 | 245 |
| 45 | 246 | 245 | 1 | 246 |
| 46 | 247 | 246 | 1 | 247 |
| 47 | 247 | 247 | 0 | 247 |
| 48 | 247 | 247 | 0 | 247 |
| 49 | 247 | 247 | 0 | 247 |
| 50 | 245 | 247 | -2 | 245 |
| 51 | 244 | 245 | -1 | 244 |
| 52 | 241 | 244 | -3 | 241 |
| 53 | 238 | 241 | -3 | 238 |
| 54 | 235 | 238 | -3 | 235 |
| 55 | 231 | 235 | -4 | 231 |
| 56 | 227 | 231 | -4 | 227 |
| 57 | 222 | 227 | -5 | 222 |
| 58 | 217 | 222 | -5 | 217 |
| 59 | 212 | 217 | -5 | 212 |
| 60 | 206 | 212 | -6 | 206 |
| ⋮ | ⋮ | ⋮ | ⋮ | ⋮ |
| 180 | 26 | 31 | -5 | 26 |
| 181 | 22 | 26 | -4 | 22 |
| 182 | 19 | 22 | -3 | 19 |
| 183 | 15 | 19 | -4 | 15 |
| 184 | 13 | 15 | -2 | 13 |
| 185 | 11 | 13 | -2 | 11 |
| 186 | 9 | 11 | -2 | 9 |
| 187 | 8 | 9 | -1 | 8 |
| 188 | 8 | 8 | 0 | 8 |
| 189 | 8 | 8 | 0 | 8 |
| 190 | 8 | 8 | 0 | 8 |
| 191 | 9 | 8 | 1 | 9 |
| 192 | 11 | 9 | 2 | 11 |
| 193 | 13 | 11 | 2 | 13 |
| 194 | 15 | 13 | 2 | 15 |
| 195 | 19 | 15 | 4 | 19 |
| 196 | 22 | 19 | 3 | 22 |
| 197 | 26 | 22 | 4 | 26 |
| 198 | 31 | 26 | 5 | 31 |
| 199 | 36 | 31 | 5 | 36 |
| 200 | 41 | 36 | 5 | 41 |
| ⋮ | ⋮ | ⋮ | ⋮ | ⋮ |

FIG. 10

| FRAME No. | GRADATION VALUE OF VIDEO DATA | INTEGRAL VALUE | OUTPUT VALUE OF TRANSMITTER | LUMINANCE VALUE OF DISPLAY DEVICE |
|---|---|---|---|---|
| 0 | 0 | 0 | 0 | 0 |
| 1 | 8 | 0 | 1 | 1 |
| 2 | 8 | 1 | 1 | 2 |
| 3 | 8 | 2 | 1 | 3 |
| 4 | 8 | 3 | 1 | 4 |
| 5 | 8 | 4 | 1 | 5 |
| 6 | 8 | 5 | 1 | 6 |
| 7 | 8 | 6 | 1 | 7 |
| 8 | 8 | 7 | 1 | 8 |
| 9 | 8 | 8 | 1 | 9 |
| 10 | 8 | 9 | 1 | 10 |
| 11 | 8 | 10 | -1 | 9 |
| 12 | 8 | 9 | -1 | 8 |
| 13 | 8 | 8 | -1 | 7 |
| 14 | 8 | 7 | 1 | 8 |
| 15 | 8 | 8 | 1 | 9 |
| 16 | 8 | 9 | 1 | 10 |
| ⋮ | ⋮ | ⋮ | ⋮ | ⋮ |
| 273 | 103 | 104 | 1 | 105 |
| 274 | 104 | 105 | 1 | 106 |
| 275 | 104 | 106 | -1 | 105 |
| 276 | 105 | 105 | -1 | 104 |
| 277 | 105 | 104 | 1 | 105 |
| 278 | 106 | 105 | 1 | 106 |
| 279 | 107 | 106 | 1 | 107 |
| 280 | 107 | 107 | 1 | 108 |
| 281 | 108 | 108 | 1 | 109 |
| 282 | 108 | 109 | 1 | 110 |
| ⋮ | ⋮ | ⋮ | ⋮ | ⋮ |
| 600 | 246 | 247 | 1 | 248 |
| 601 | 246 | 248 | -1 | 247 |
| 602 | 246 | 247 | -1 | 246 |
| 603 | 247 | 246 | 1 | 247 |
| 604 | 247 | 247 | 1 | 248 |
| 605 | 247 | 248 | 1 | 249 |
| 606 | 247 | 249 | -1 | 248 |
| 607 | 247 | 248 | -1 | 247 |
| 608 | 247 | 247 | -1 | 246 |
| 609 | 247 | 246 | 1 | 247 |
| 610 | 247 | 247 | 1 | 248 |
| ⋮ | ⋮ | ⋮ | ⋮ | ⋮ |
| 992 | 98 | 99 | 1 | 100 |
| 993 | 98 | 100 | -1 | 99 |
| 994 | 97 | 99 | -1 | 98 |
| 995 | 96 | 98 | -1 | 97 |
| 996 | 96 | 97 | -1 | 96 |
| 997 | 95 | 96 | -1 | 95 |
| 998 | 95 | 95 | -1 | 94 |
| 999 | 94 | 94 | -1 | 93 |
| 1000 | 93 | 93 | -1 | 92 |

FIG. 15

| FRAME No. | GRADATION VALUE OF VIDEO DATA | INTEGRAL VALUE | DIFFERENCE | OUTPUT VALUE OF TRANSMITTER | INVERSE QUANTIZER VALUE | LUMINANCE VALUE OF DISPLAY DEVICE |
|---|---|---|---|---|---|---|
| 0 | 0 | 0 | 0 | 0 | 0 | 0 |
| 1 | 10 | 0 | 10 | 3 | 8 | 8 |
| 2 | 17 | 8 | 9 | 3 | 8 | 16 |
| 3 | 28 | 16 | 12 | 3 | 8 | 24 |
| 4 | 44 | 24 | 20 | 4 | 16 | 40 |
| 5 | 63 | 40 | 23 | 4 | 16 | 56 |
| 6 | 84 | 56 | 28 | 4 | 16 | 72 |
| 7 | 107 | 72 | 35 | 5 | 32 | 104 |
| 8 | 131 | 104 | 27 | 4 | 16 | 120 |
| 9 | 155 | 120 | 35 | 5 | 32 | 152 |
| 10 | 177 | 152 | 25 | 4 | 16 | 168 |
| 11 | 198 | 168 | 30 | 4 | 16 | 184 |
| 12 | 216 | 184 | 32 | 5 | 32 | 216 |
| 13 | 230 | 216 | 14 | 3 | 8 | 224 |
| 14 | 241 | 224 | 17 | 4 | 16 | 240 |
| 15 | 246 | 240 | 6 | 2 | 4 | 244 |
| 16 | 247 | 244 | 3 | 1 | 2 | 246 |
| 17 | 244 | 246 | -2 | -1 | -2 | 244 |
| 18 | 235 | 244 | -9 | -3 | -8 | 236 |
| 19 | 222 | 236 | -14 | -3 | -8 | 228 |
| 20 | 206 | 228 | -22 | -4 | -16 | 212 |
| 21 | 186 | 212 | -26 | -4 | -16 | 196 |
| 22 | 164 | 196 | -32 | -5 | -32 | 164 |
| 23 | 141 | 164 | -23 | -4 | -16 | 148 |
| 24 | 117 | 148 | -31 | -4 | -16 | 132 |
| 25 | 93 | 132 | -39 | -5 | -32 | 100 |
| 26 | 71 | 100 | -29 | -4 | -16 | 84 |
| 27 | 51 | 84 | -33 | -5 | -32 | 52 |
| 28 | 34 | 52 | -18 | -4 | -16 | 36 |
| 29 | 21 | 36 | -15 | -3 | -8 | 28 |
| 30 | 12 | 28 | -16 | -4 | 16 | 12 |
| 31 | 8 | 12 | -4 | -2 | -4 | 8 |
| ⋮ | ⋮ | ⋮ | ⋮ | ⋮ | ⋮ | ⋮ |
| 157 | 8 | 12 | -4 | -2 | -4 | 8 |
| 158 | 10 | 8 | 2 | 1 | 2 | 10 |
| 159 | 16 | 10 | 6 | 2 | 4 | 14 |
| 160 | 27 | 14 | 13 | 3 | 8 | 22 |
| 161 | 43 | 22 | 21 | 4 | 16 | 38 |
| 162 | 61 | 38 | 23 | 4 | 16 | 54 |
| 163 | 82 | 54 | 28 | 4 | 16 | 70 |
| 164 | 105 | 70 | 35 | 5 | 32 | 102 |
| 165 | 129 | 102 | 27 | 4 | 16 | 118 |
| 166 | 153 | 118 | 35 | 5 | 32 | 150 |
| 167 | 176 | 150 | 26 | 4 | 16 | 166 |
| 168 | 197 | 166 | 31 | 4 | 16 | 182 |
| 169 | 215 | 182 | 33 | 5 | 32 | 214 |
| 170 | 229 | 214 | 15 | 3 | 8 | 222 |
| 171 | 240 | 222 | 18 | 4 | 16 | 238 |
| 172 | 246 | 238 | 8 | 3 | 8 | 246 |
| 173 | 247 | 246 | 1 | 0 | 1 | 247 |
| 174 | 244 | 247 | -3 | -1 | -2 | 245 |
| 175 | 236 | 245 | -9 | -3 | -8 | 237 |
| 176 | 224 | 237 | -13 | -3 | -8 | 229 |
| 177 | 207 | 229 | -22 | -4 | -16 | 213 |
| 178 | 188 | 213 | -25 | -4 | -16 | 197 |
| ⋮ | ⋮ | ⋮ | ⋮ | ⋮ | ⋮ | ⋮ |

FIG. 18

| VARIATION VALUE | GRADATION VALUE OF VIDEO DATA | | | | | | ... | | | | | | | | | | ... | | | | | |
|---|---|---|---|---|---|---|---|---|---|---|---|---|---|---|---|---|---|---|---|---|---|---|
| | 0 | 1 | 2 | 3 | 4 | | | 100 | 101 | 102 | 103 | | | 237 | 238 | 239 | 240 |
| 0 | 0 | 0 | 0 | 0 | 0 | | | 6 | 6 | 6 | 6 | | | 14 | 14 | 14 | 15 |
| 1 | 0 | 0 | 0 | 0 | 0 | | | 6 | 6 | 6 | 6 | | | 14 | 14 | 15 | 15 |
| 2 | 0 | 0 | 0 | 0 | 0 | | | 6 | 6 | 6 | 6 | | | 14 | 15 | 15 | 15 |
| 3 | 0 | 0 | 0 | 0 | 0 | | | 6 | 6 | 6 | 6 | | | 15 | 15 | 15 | 15 |
| 4 | 0 | 0 | 0 | 0 | 0 | | | 6 | 6 | 6 | 6 | | | 15 | 15 | 15 | 15 |
| 5 | 0 | 0 | 0 | 0 | 0 | | | 6 | 6 | 6 | 6 | | | 15 | 15 | 15 | 15 |
| 6 | 0 | 0 | 0 | 0 | 0 | | | 6 | 6 | 6 | 6 | | | 15 | 15 | 15 | 15 |
| 7 | 0 | 0 | 0 | 0 | 0 | | | 6 | 6 | 6 | 6 | | | 15 | 15 | 15 | 15 |
| 8 | 0 | 0 | 0 | 0 | 0 | | | 6 | 6 | 6 | 6 | | | 15 | 15 | 15 | 15 |
| 9 | 0 | 0 | 0 | 0 | 0 | | | 6 | 6 | 6 | 7 | | | 15 | 15 | 15 | 15 |
| 10 | 0 | 0 | 0 | 0 | 0 | | | 6 | 6 | 7 | 7 | | | 15 | 15 | 15 | 15 |
| 11 | 0 | 0 | 0 | 0 | 0 | | | 7 | 7 | 7 | 7 | | | 15 | 15 | 15 | 15 |
| 12 | 0 | 0 | 0 | 0 | 1 | | | 7 | 7 | 7 | 7 | | | 15 | 15 | 15 | 15 |
| 13 | 0 | 0 | 0 | 1 | 1 | | | 7 | 7 | 7 | 7 | | | 15 | 15 | 15 | 15 |
| 14 | 0 | 0 | 1 | 1 | 1 | | | 7 | 7 | 7 | 7 | | | 15 | 15 | 15 | 15 |
| 15 | 0 | 1 | 1 | 1 | 1 | | | 7 | 7 | 7 | 7 | | | 15 | 15 | 15 | 15 |

| INTEGRAL VALUE | 0 | 1 | 2 | 3 | 4 | | 100 | 101 | 102 | 103 | | 237 | 238 | 239 | 240 |

FIG. 19

| VARIATION VALUE | GRADATION VALUE OF VIDEO DATA | | | | | | ... | | | | | | ... | | | | | |
|---|---|---|---|---|---|---|---|---|---|---|---|---|---|---|---|---|---|---|
| | 0 | 1 | 2 | 3 | 4 | ... | 100 | 101 | 102 | 103 | ... | 237 | 238 | 239 | 240 |
| 0 | 0 | 0 | 0 | 0 | 0 | | 6 | 6 | 6 | 6 | | 14 | 14 | 14 | 15 |
| 15 | 0 | 1 | 1 | 1 | 1 | | 7 | 7 | 7 | 7 | | 15 | 15 | 15 | 15 |
| 7 | 0 | 0 | 0 | 0 | 0 | | 6 | 6 | 6 | 6 | | 15 | 15 | 15 | 15 |
| 8 | 0 | 0 | 0 | 0 | 0 | | 6 | 6 | 6 | 6 | | 15 | 15 | 15 | 15 |
| 3 | 0 | 0 | 0 | 0 | 0 | | 6 | 6 | 6 | 6 | | 15 | 15 | 15 | 15 |
| 12 | 0 | 0 | 0 | 0 | 1 | | 7 | 7 | 7 | 7 | | 15 | 15 | 15 | 15 |
| 4 | 0 | 0 | 0 | 0 | 0 | | 6 | 6 | 6 | 6 | | 15 | 15 | 15 | 15 |
| 11 | 0 | 0 | 0 | 0 | 0 | | 6 | 6 | 6 | 6 | | 14 | 14 | 15 | 15 |
| 1 | 0 | 0 | 1 | 1 | 1 | | 7 | 7 | 7 | 7 | | 15 | 15 | 15 | 15 |
| 14 | 0 | 0 | 0 | 0 | 0 | | 6 | 6 | 6 | 6 | | 15 | 15 | 15 | 15 |
| 6 | 0 | 0 | 0 | 0 | 0 | | 6 | 6 | 6 | 6 | | 15 | 15 | 15 | 15 |
| 9 | 0 | 0 | 0 | 0 | 0 | | 6 | 6 | 6 | 6 | | 14 | 15 | 15 | 15 |
| 2 | 0 | 0 | 0 | 1 | 1 | | 7 | 7 | 7 | 7 | | 15 | 15 | 15 | 15 |
| 13 | 0 | 0 | 0 | 0 | 0 | | 6 | 6 | 6 | 6 | | 15 | 15 | 15 | 15 |
| 5 | 0 | 0 | 0 | 0 | 0 | | 6 | 6 | 6 | 6 | | 15 | 15 | 15 | 15 |
| 10 | 0 | 0 | 0 | 0 | 0 | | 6 | 6 | 7 | 7 | | 15 | 15 | 15 | 15 |

| INTEGRAL VALUE | 0 | 1 | 2 | 3 | 4 | | 100 | 101 | 102 | 103 | | 237 | 238 | 239 | 240 |

VIDEO SIGNAL PROCESSING DEVICE, VIDEO DISPLAY SYSTEM, AND VIDEO SIGNAL PROCESSING METHOD

TECHNICAL FIELD

The present disclosure relates to a video signal processing device, a video display system, and a video signal processing method, and particularly, to a video signal processing device, a video display system, and a video signal processing method suitable for a video having a relatively high frame rate.

BACKGROUND ART

A video display system that displays a video on a display device by performing image processing or transmission for a video (moving image) is generally designed to operate at a frame rate of 60 fps (frame per second) or less in consideration of human vision. In the video display system, for example, when the frame rate is 60 fps, since the time per frame is approximately 16.6 ms, a plurality of images are processed and transmitted until a video generated by an imaging device is displayed on a display device, and thus, a certain amount of delay (for example, 100 ms) is generated in the entire system.

Delay in video display for the imaging (video output) can adversely affect stability of an operation of a robot or the like in a real-time system involving feedback, such as when an industrial robot picks up an irregularly moving target. Further, removing the delay in video display is also beneficial for a video display system used for endoscopic surgery and remote surgery using a real-time video, a remote control of a disaster relief robot, and the like.

Meanwhile, it is conceivable to remove (suppress) the delay by applying a relatively high frame rate (for example, 960 fps) to the video, but when the frame rate is simply increased, the amount of transmission and the amount of calculation increase.

In the related art, as a technique for suppressing the amount of transmission while maintaining a high resolution of a video, for example, a technique is known in which, regarding a video imaged by a monitoring camera, attention is paid to a vicinity of a door where a person enters and exits, and a target monitoring area to be monitored is displayed at a high frame rate, and an area that is a background of a target monitoring area such as a place where plants are placed or a wall is transmitted at a low frame rate in consideration of effective use of a network bandwidth.

CITATION LIST

Patent Literature

PTL 1: JP-A-2008-219484

SUMMARY OF THE INVENTION

However, in the related art described in Patent Literature 1, a high frame rate of approximately 30 frames/sec is assumed, but since maintaining a high resolution of a video is premised, when a higher frame rate (for example, 960 fps) is applied, even if application of the high frame rate is a part (target monitoring area) of the image, an increase in the amount of transmission and the amount of calculation may be a problem.

Further, in the above-described technique of related art, encoding processing is performed for data in a target monitoring area by a method such as MPEG, but when a higher frame rate (for example, 960 fps) is applied, an exposure time in imaging becomes short and an S/N ratio of the video is decreased, which may cause a problem that a compression ratio of an image in the encoding processing such as MPEG does not increase.

The present disclosure is made in view of the problem of the related art, and a main object of the present disclosure is to provide a video signal processing device, a video display system, and a video signal processing method that, when transmitting a video (for example, a video having a frame rate of more than 60 fps) having a relatively high frame rate, can suppress an increase in the amount of transmission and the amount of calculation of a video while suppressing a decrease in quality of a displayed video.

The video signal processing device according to the present disclosure provides efficient and low-delay video data compression based on a human visual phenomenon that occurs only when a video having a high frame rate is displayed.

A video signal processing device according to the present disclosure, which outputs video data of a second gradation having a second bit number smaller than a first bit number by encoding input video data of a first gradation having a first bit number, includes a quantizer that sequentially outputs quantized data obtained by quantizing input data based on the video data of the first gradation into the video data of the second gradation, a storage that sequentially stores the quantized data output from the quantizer, a difference calculator that sequentially calculates differences between the video data of the first gradation for a current frame and the quantized data for a previous frame stored in the storage, and an integrator that sequentially outputs integral data obtained by sequentially integrating the differences output from the difference calculator as the input data of the quantizer.

Further, a video display system according to the present disclosure includes the video signal processing device, an imaging device that generates video data of a first gradation having the first bit number, a decoding circuit that receives the video data of the second gradation output from the video signal processing device and decodes the received video data of the second gradation, and a display device that displays a video based on the video data of the second gradation decoded by the decoding circuit.

Further, a video signal processing method according to the resent disclosure for outputting video data of a second gradation having a second bit number smaller than a first bit number by encoding input video data of a first gradation having a first bit number, includes sequentially quantizing input data based on the video data of the first gradation into the video data of the second gradation, sequentially storing the quantized data quantized into the video data of the second gradation, sequentially calculating differences between the video data of the first gradation for a current frame and the stored quantized data for a previous frame, and generating integral data obtained by sequentially integrating the differences as the input data.

According to the present disclosure, when transmitting a video having a relatively high frame rate (for example, a video having a frame rate exceeding 60 fps), video data is transmitted with low-delay while being efficiently compressed, and it is possible to recover a visual gradation by correcting a subsequent frame. This increases temporal flicker (flicker) even when performed at a relatively low frame rate of related art, but functions uniquely at a high frame rate.

BRIEF DESCRIPTION OF DRAWINGS

FIG. 4 is an explanatory diagram illustrating an operation example of the video signal processing device illustrated in FIG. 3.

FIG. 8 is an explanatory diagram illustrating a first operation example of the video signal processing device illustrated in FIG. 7.

FIG. 10 is an explanatory diagram illustrating a second operation example of the video signal processing device illustrated in FIG. 7.

FIG. 15 is an explanatory diagram illustrating an operation example of the video signal processing device illustrated in FIG. 14.

FIG. 18 is an explanatory diagram illustrating a first operation example of the video signal processing device illustrated in FIG. 17.

FIG. 19 is an explanatory diagram illustrating a second operation example of the video signal processing device illustrated in FIG. 17.

DESCRIPTION OF EMBODIMENTS

Figure 1:
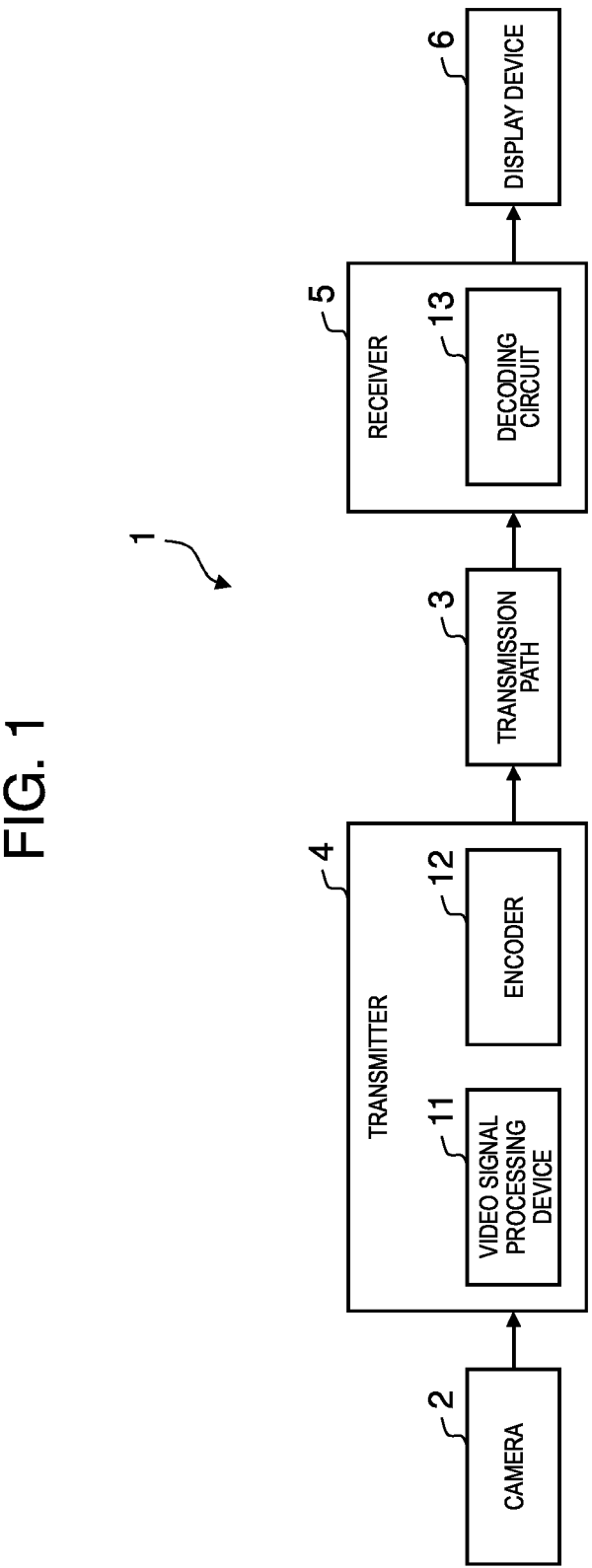
FIG. 1 is an entire configuration diagram of a video display system according to a first exemplary embodiment.

A first invention for solving the problems described above is a video signal processing device that outputs video data of a second gradation having a second bit number smaller than a first bit number by encoding input video data of a first gradation having a first bit number, and includes a quantizer that sequentially outputs quantized data obtained by quantizing input data based on the video data of the first gradation into the video data of the second gradation, a storage that sequentially stores the quantized data output from the quantizer, a difference calculator that sequentially calculates differences between the video data of the first gradation for a current frame and the quantized data for a previous frame stored in the storage, and an integrator that sequentially outputs integral data obtained by sequentially integrating the differences output from the difference calculator as the input data of the quantizer.

According to this, since a configuration in which gradation of input video data is reduced by quantization, and information (low bits) excluded by the quantization is reflected in a subsequent frame, when transmitting a video (for example, a video having a frame rate exceeding 60 fps) having a relatively high frame rate, it is possible to suppress an increase in the amount of transmission and the amount of calculation of a video while suppressing a decrease in quality of a displayed video.

Further, a second invention is a video signal processing device that outputs video data of a second gradation having a second bit number smaller than a first bit number by encoding input video data of a first gradation having a first bit number, the device, and includes a quantizer that sequentially outputs quantized data obtained by quantizing input data based on the video data of the first gradation into the video data of the second gradation, a storage that sequentially stores the quantized data output from the quantizer, an integrator that sequentially outputs integral data obtained by sequentially integrating the quantized data stored in the storage, and a difference calculator that sequentially calculates differences between the video data of the first gradation and the integral data and sequentially outputs the differences as the input data of the quantizer.

According to this, since a configuration is provided in which gradation of input video data is reduced by quantization, and information (low bits) excluded by the quantization is reflected in a subsequent frame, when transmitting a video (for example, a video having a frame rate exceeding 60 fps) having a relatively high frame rate, it is possible to suppress an increase in the amount of transmission and the amount of calculation of a video while suppressing a decrease in quality of a displayed video.

Further, a third invention is a video signal processing device that outputs video data of a second gradation having a second bit number smaller than a first bit number by encoding input video data of a first gradation having a first bit number, and includes a pattern generator that sequentially generates variation value data having the second bit number statistically or stochastically, an adder that sequentially adds the variation value data to the video data of the first gradation, and a quantizer that sequentially outputs quantized data obtained by quantizing data output from the adder into the video data of the second gradation.

According to this, since a configuration is provided in which gradation of input video data is reduced by quantization and the information excluded by the quantization is reflected as variation value data to be replaced, when a video (for example, a video having a frame rate exceeding 60 fps) having a relatively high frame rate is transmitted, it is possible to suppress an increase in the amount of transmission and the amount of calculation of a video while suppressing a decrease in quality of the displayed video.

Further, in a fourth invention further includes a motion predictor that calculates a motion vector between the video data of the first gradation for a current frame and the video data of the first gradation for a previous frame, and a motion compensator that corrects the integral data of the integrator based on the motion vector.

According to this, even when a moving object exists in a video, it is possible to appropriately reflect information (low bits) excluded by quantization in a subsequent frame.

Further, in a fifth invention further includes an encoder that compresses and encodes the quantized data output from the quantizer, and a decoder that decodes the quantized data output from the encoder, in which the storage sequentially stores the quantized data decoded by the decoder.

According to this, even when irreversible compression encoding such as MPEG is performed by an encoder, it is possible to suppress noise generated by the compression encoding.

Further, in a sixth invention, a frame rate for the video data of the first gradation is higher than 60 fps.

According to this, for a video having a relatively high frame rate, it is possible to effectively suppress an increase in the amount of transmission and the amount of calculation of an encoded video while suppressing a decrease in quality of a displayed video.

Further, a seventh invention includes the video signal processing device according to any one of the first to sixth inventions, an imaging device that generates video data of a first gradation having the first bit number, a decoding circuit that receives the video data of the second gradation output from the video signal processing device and decodes the received video data of the second gradation, and a display device that displays a video based on the video data of the second gradation decoded by the decoding circuit.

According to this, even when a video (for example, a video having a frame rate exceeding 60 fps) having a relatively high frame rate is processed, it is possible to effectively suppress an increase in the amount of transmission and the amount of calculation of an encoded video while suppressing a decrease in quality of a displayed video.

Further, an eighth invention is a video signal processing method for outputting video data of a second gradation having a second bit number smaller than a first bit number by encoding input video data of a first gradation having a first bit number, and includes sequentially quantizing input data based on the video data of the first gradation into the video data of the second gradation, sequentially storing the quantized data quantized into the video data of the second gradation, sequentially calculating differences between the video data of the first gradation for a current frame and the stored quantized data for a previous frame, and generating integral data obtained by sequentially integrating the differences as the input data.

According to this, since a configuration is provided in which gradation of input video data is reduced by quantization and the information excluded by the quantization is reflected in a subsequent frame, when a video having a relatively high frame rate is transmitted, it is possible to suppress an increase in the amount of transmission and the amount of calculation of a video while suppressing a decrease in quality of the displayed video.

Further, a ninth invention is a video signal processing method for outputting video data of a second gradation having a second bit number smaller than a first bit number by encoding input video data of a first gradation having a first bit number, and includes sequentially quantizing input data based on the video data of the first gradation into the video data of the second gradation, sequentially storing the quantized data quantized into the video data of the second gradation, sequentially generating integral data obtained by sequentially integrating the stored quantized data, and sequentially calculating differences between the video data of the first gradation and the integral data as the input data.

According to this, since a configuration is provided in which gradation of input video data is reduced by quantization and the information excluded by the quantization is reflected in a subsequent frame, when a video having a relatively high frame rate is transmitted, it is possible to suppress an increase in the amount of transmission and the amount of calculation of a video while suppressing a decrease in quality of the displayed video.

Further, a tenth invention is a video signal processing method for outputting video data of a second gradation having a second bit number smaller than a first bit number by encoding input video data of a first gradation having a first bit number, and includes sequentially generating variation value data having the second bit number statistically or stochastically, sequentially adding the variation value data to the input video data of the first gradation, and sequentially outputting quantized data obtained by quantizing the added data to the video data of the second gradation.

According to this, since a configuration is provided in which gradation of input video data is reduced by quantization and the information (low bits) excluded by the quantization is reflected as variation value data to be replaced, when a video (for example, a video having a frame rate exceeding 60 fps) having a relatively high frame rate is transmitted, it is possible to suppress an increase in the amount of transmission and the amount of calculation of a video while suppressing a decrease in quality of the displayed video.

Hereinafter, exemplary embodiments of the present disclosure will be described with reference to the drawings.

First Exemplary Embodiment

Figure 2:
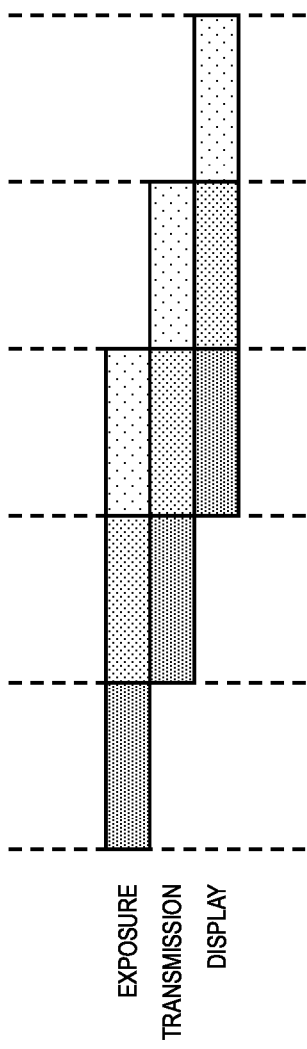
FIG. 2 is a time chart illustrating an example of processing of the video display system.

FIG. 1 is an entire configuration diagram of video display system 1 according to a first exemplary embodiment of the present disclosure, and FIG. 2 is a time chart illustrating an example of processing (exposure, transmission, and display) of video display system 1.

As illustrated in FIG. 1, video display system 1 mainly includes camera (imaging device) 2 that captures a desirable video, transmitter 4 that transmits video data (video signal) input from camera 2 via transmission path 3, receiver 5 that receives the video data received from transmitter 4, and a display device 6 that displays a video based on the video data received by receiver 5.

Camera 2 is a video camera having a known imaging function and a known communication function (including wireless communication) and is a high-speed camera capable of outputting a video of a relatively high frame rate (here, 960 fps) exceeding human visual time sensitivity (that is, temporal resolution of visual information processing) herein. Camera 2 is communicably connected to transmitter 4 via a known communication cable (or communication network), and video data generated by imaging of camera 2 are sequentially output to transmitter 4 in real time. Although gradation of the image captured by camera 2 is not limited in particular, each gradation is for example, 8 bits (24-bit color) in RGB.

Transmitter 4 and receiver 5 include known hardware, for example, a processor such as a CPU (Central Processing Unit) or a GPU (Graphics Processing Unit), and a memory.

Further, as will be described below, transmitter 4 and receiver 5 have an image processing function for performing necessary image processing for video data, and a known wired or wireless communication function for mutually transmitting and receiving video data via known communication cable or transmission path 3 configured from a communication network. Transmitter 4 may be provided integrally with camera 2, and receiver 5 may be provided integrally with display device 6.

Transmitter 4 includes video signal processing device 11 that outputs video data of a second gradation having a second bit number having (for example, 4 bits) smaller than a first bit number by encoding video data of a first gradation having the first bit number (for example, 8 bits) and encoder 12 that performs compression encoding (data compression) processing for video data output from video signal processing device 11 based on a known method such as MPEG or run-length encoding. Further, receiver 5 includes decoding circuit 13 that decodes the quantized video data received from transmitter 4 and generates display data that is displayable on display device 6 based on the decoded video data. Decoding circuit 13 has a function of sequentially integrating video data from transmitter 4 in video display system 1 according to the second exemplary embodiment which will be described below.

Display device 6 has a function of displaying a video according to a frame rate of the video data transmitted from transmitter 4 and is configured by, for example, a liquid crystal display, a plasma display, and the like, which have a known configuration, while not limited in particular.

Video display system 1 can display a video having a relatively high frame rate captured by camera 2 on display device 6 without causing a large delay due to transmission and the like, and is suitably used for, for example, endoscopic surgery and remote surgery using a real-time video, a remote control of a disaster relief robot, and the like.

Further, as illustrated in FIG. 2, video display system 1 can set exposure of an image sensor of camera 2, transmission of video data between transmitter 4 and receiver 5, and display processing of display device 6 so as to be synchronized at a predetermined cycle (an interval between dashed lines of FIG. 2).

Figure 3:
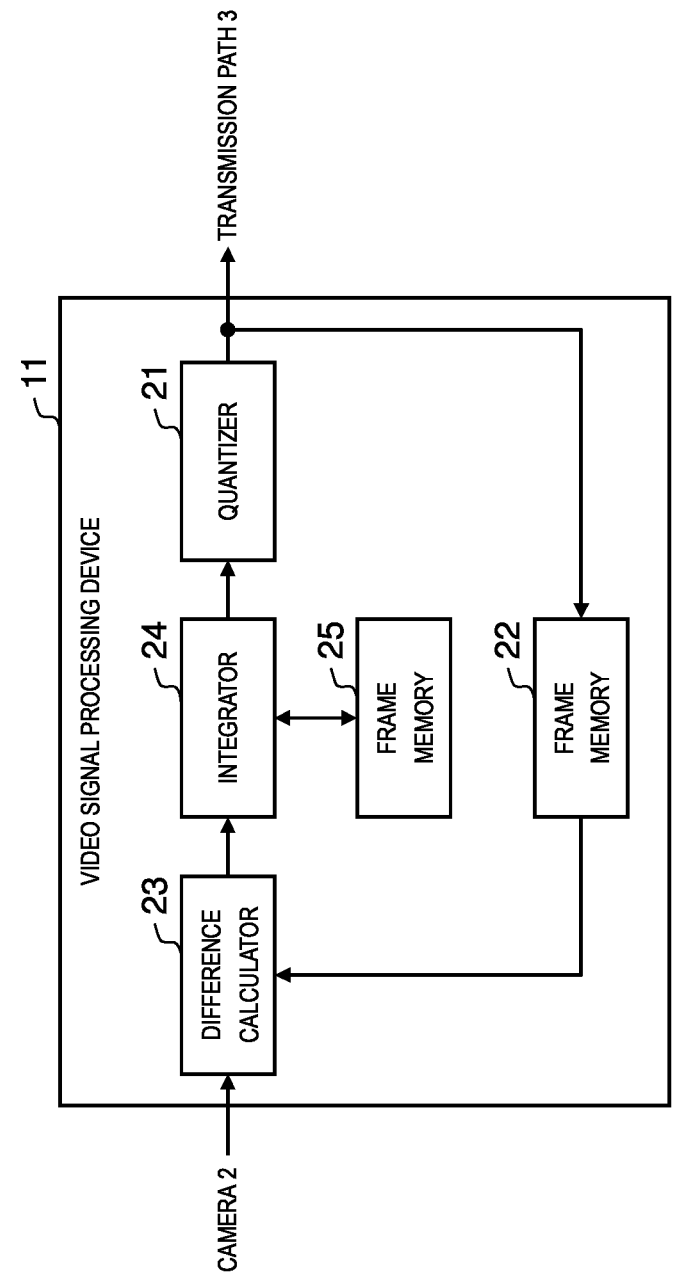
FIG. 3 is a block diagram illustrating a schematic configuration of a video signal processing device.

FIG. 3 is a block diagram illustrating a schematic configuration of video signal processing device 11 according to the first exemplary embodiment illustrated in FIG. 1, and FIG. 4 is an explanatory diagram illustrating an operation example of video signal processing device 11 according to the first exemplary embodiment.

Video signal processing device 11 includes quantizer 21, first frame memory (storage) 22, difference calculator 23, integrator 24, and a second frame memory 25.

Quantizer 21 quantizes data (input data) based on the video data of the first gradation (for example, 8 bits) output from integrator 24 into video data of the second gradation (for example, 4 bits) and sequentially outputs the quantized data. For example, quantizer 21 can obtain higher 4 bits of the 8-bit input data of the first gradation (that is, discards low 4 bits), thereby, generating data (quantized data) whose gradation is lowered to the second gradation. The quantized data are sequentially output to transmission path 3 side (here, encoder 12) as video data and are sequentially stored in first frame memory 22 configured by a known memory such as an SDRAM.

Difference calculator 23 sequentially calculates differences between the 8-bit video data for the current frame sequentially input from camera 2 and the quantized data for a previous frame (here, an immediately preceding frame) stored in first frame memory 22. With this configuration, information of the low 4 bits rounded down by processing of quantizer 21 can be sequentially reflected in a subsequent frame by a feedback loop via first frame memory 22 and difference calculator 23.

Integrator 24 sequentially outputs integral data obtained by sequentially integrating the differences output from difference calculator 23 as input data of quantizer 21. The calculated integral data are sequentially stored in second frame memory 25 configured by a known memory such as an SDRAM (Synchronous Dynamic Random Access Memory) and are sequentially read when calculating the next integral data.

FIG. 4 illustrates a case in which each gradation value of 8-bit video data (input data) set from 0 to 240 at times t0 to t15 set at a predetermined time interval (for example, 1 ms) is input from camera 2 to video signal processing device 11 as an operation example of video signal processing device 11 according to the first exemplary embodiment. Here, for the sake of convenient description, a case in which the respective gradation values (the same gradation value) are continuously input (the respective gradation value does not change over 16 frames) for predetermined pixels of 16 frames respectively corresponding to the times t0 to t15 is illustrated. However, the gradation values of actual video data can be appropriately changed for each frame.

Here, quantizer 21 converts the gradation values of the 8-bit video data into 4-bit video data configured by gradation values of 0 to 15 and sequentially outputs the data. For example, when the gradation value of the video data is 3, an initial value output from the quantizer 21 is a value obtained by dividing 3 by 16 (however, when a numerical value less than 1 is generated, the value is rounded down (the same applies hereinafter)), and an initial value of the integral value (an output value from integrator 24) is 0.

Further, when the gradation value of the video data is 3, at time to, the output value from quantizer 21 (consequently, an output value from transmitter 4) becomes 0 which is a value obtained by dividing a value obtained by adding the gradation value 3 of the video data to the initial value 0 of the integral value by 16, and the integral value becomes 3 which is a value obtained by adding a difference (that is, a value calculated by difference calculator 23) between the gradation value 3 of the video data and the initial value output from quantizer 21 to the initial value 0. Here, a value inversely quantized by multiplying the value output from quantizer 21 by 16 is used for calculation of difference performed by difference calculator 23 (the same applies hereinafter).

At the subsequent time t1, the value output from quantizer 21 becomes 0 which is a value obtained by dividing a value obtained by adding the gradation value 3 of the video data to the integral value 3 at time t0 by 16, and the integral value becomes 6 which is a value obtained by adding a difference between the gradation value 3 of the video data and the value output from quantizer 21 at the time t0 to the integral value 3 of the time t0.

At the subsequent time t2, the value output from quantizer 21 becomes 0 which is a value obtained by dividing a value obtained by adding the gradation value 3 of the video data to the integral value 6 at time t1 by 16, and the integral value becomes 9 which is a value obtained by adding a difference between the gradation value 3 of the video data and the value output from quantizer 21 at the time t1 to the integral value 6 of the time t1. Thereafter, the output value from quantizer 21 and the integral value at time t3 to time t15 are also set in the same manner as in the above-described case. Further, even when the gradation value of the video data is other than 3, the output value from quantizer 21 and the integral value at the times t0 to t15 can be obtained in the same manner as in the above-described case.

Further, for each gradation value, a value (inversely quantized value of the average value) obtained by multiplying an average value of the output values from quantizer 21 at times t0 to t15 by 16 is approximately the same as an original gradation value.

As such, since video signal processing device 11 according to the first exemplary embodiment is configured to reduce the gradation of the video data input from camera 2 by quantization and to reflect the information (here, the low 4 bits) excluded by the quantization in the subsequent frame via the integral value of integrator 24, when transmitting a video (for example, video having a frame rate exceeding 60 fps) having a relatively high frame rate exceeding the human visual time sensitivity, it is possible to suppress an increase in the amount of transmission and the amount of calculation of a video while suppressing a decrease in quality of the display image of display device 6.

In this case, although the data of the second gradation (here, 4 bits) is output from transmitter 4, a user who views an image displayed on display device 6 perceives images of approximately 10 to 20 frames (corresponds to a plurality of frames at times t0 to t15 of each gradation value in the example of FIG. 4) as superimposed afterimages with respect to gradation despite recognizing only one-frame delay with respect to movement of the displayed object in terms of nature of a human vision, and an effect is obtained as if the gradation excluded by transmitter 4 is visually recovered (as if an image of the first gradation (here, 8 bits) is displayed). Further, even when some data is lost during transmission of the video data from transmitter 4 to receiver 5, only a temporary drop in gradation occur and continuous decoding impossibility does not occur, and thus, there is also an advantage that a system operation can be continued without performing a retransmission control.

Video display system 1 includes other exemplary embodiments and a plurality of modification examples which will be described below, reduces the gradation of the video data for the input current frame by quantization, and the low bits (for example, low 4 bits in 8 bits) excluded by this quantization or substitute data corresponding to the low bits based on a statistical or stochastic method may be configured to be able to affect the high bits (for example, higher 4 bits in 8 bits) of the video data for the subsequent frame.

Further, an operation of video signal processing device 11 according to the first exemplary embodiment is similar to $\Delta\Sigma$ (delta sigma) modulation used for encoding a conventional audio signal, but the $\Delta\Sigma$ modulation processing on the audio signal improves audio quality by reducing an alias noise that may occur in the quantization of the audio signal, and has a different purpose and effect from the video processing of video signal processing device 11.

Figure 5:
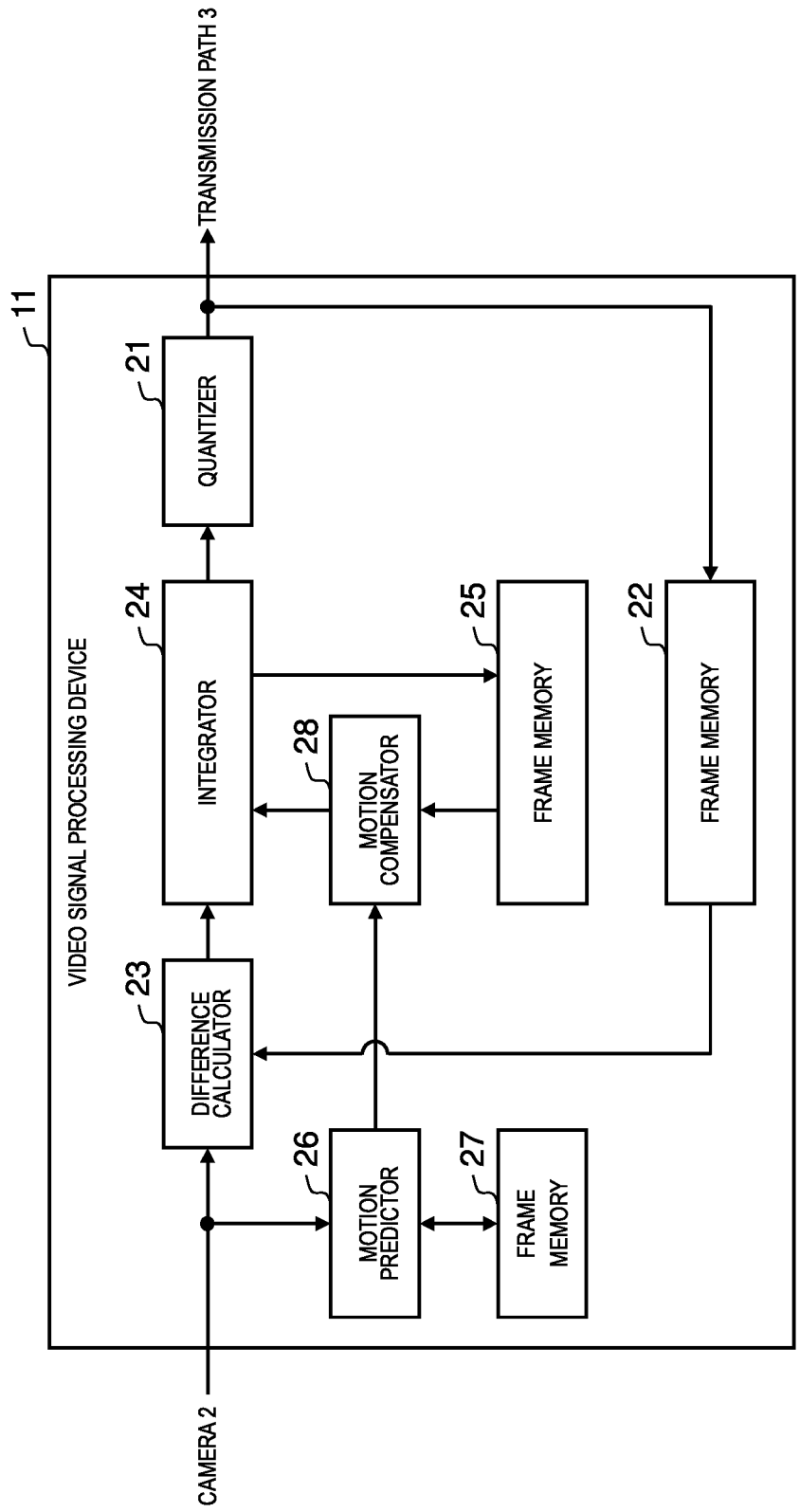
FIG. 5 is a block diagram illustrating a first modification example of the video signal processing device illustrated in FIG. 3.
Figure 6:
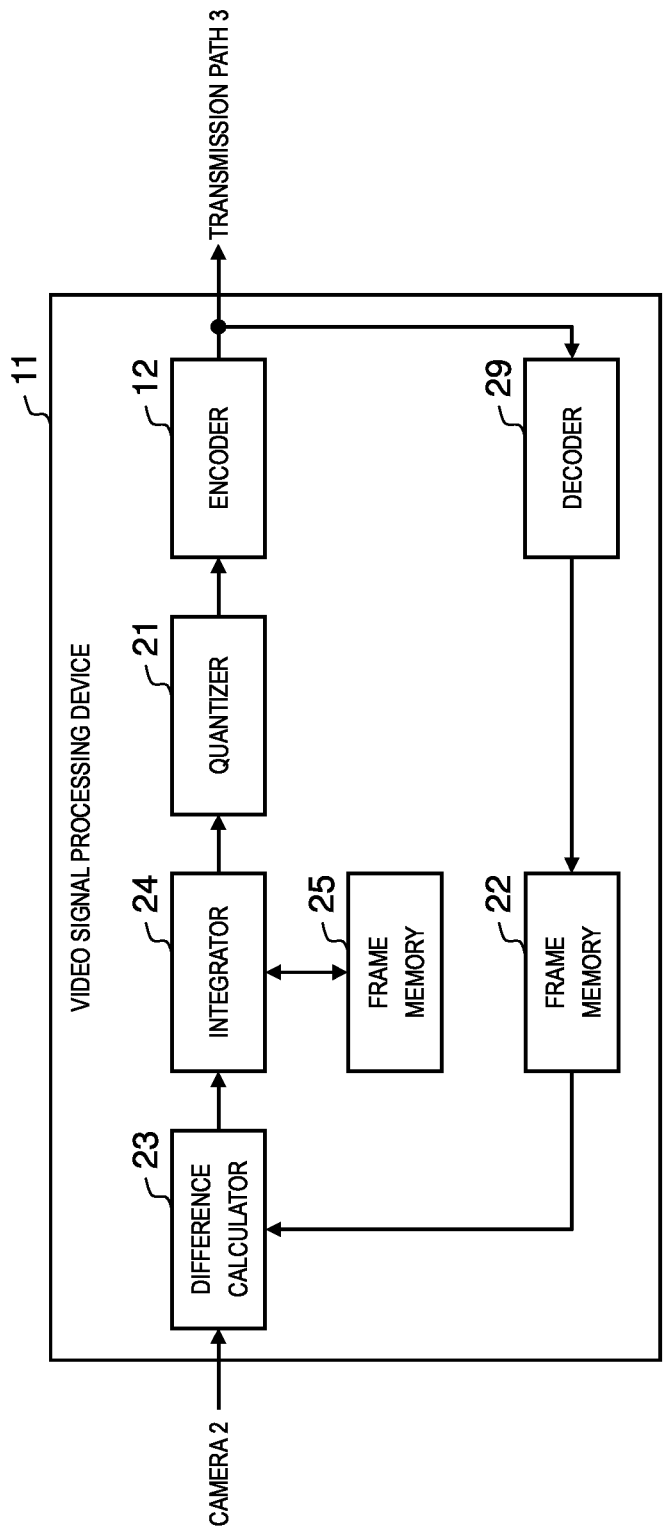
FIG. 6 is a block diagram illustrating a second modification example of the video signal processing device illustrated in FIG. 3.

FIGS. 5 and 6 are block diagrams illustrating first and second modification examples of video signal processing device 11 illustrated in FIG. 3, respectively. In FIGS. 5 and 6, the same configurations as in video signal processing device 11 illustrated in FIG. 3 are denoted by the same reference numerals. Further, regarding the first and second modification examples, items that are not described below in particular are the same as the items of video signal processing device 11 according to the first exemplary embodiment described above, and detailed description thereof will be omitted.

First Modification Example of First Exemplary Embodiment

In the above-described example, when there is a moving object in the video, for example, a quantization error (that is, low 4 bits) accumulated for a background image is applied to an image of the moving object, and thereby, quality of the image displayed in display device 6 may be reduced (for example, brightness or color of the moving object in the image changes unnaturally).

Therefore, video signal processing device 11 according to the first modification example further includes motion predictor 26, third frame memory 27, and motion compensator 28 in order to exclude influence of a moving object that may exist in a video, as illustrated in FIG. 5.

Motion predictor 26 sequentially stores video data of each frame input from camera 2 in third frame memory 27 and calculates a motion vector for each pixel from a difference between the video data of the current frame and a reference frame based on a known method such as a block matching method.

The motion compensator 28 obtains information on the motion vector calculated by motion predictor 26 and compensates a data read position of each pixel based on information on the motion vector (motion prediction) when reading the integral data from second frame memory 25.

With this configuration, video signal processing device 11 can appropriately reflect information (low bits) excluded by quantization of quantizer 21 in a subsequent frame even when a moving object exists in the video.

Second Modification Example of First Exemplary Embodiment

Further, in the example described above, when encoder 12 (see FIG. 1) behind video signal processing device 11 performs processing based on irreversible compression encoding such as MPEG, noise generated by the compression encoding is included in the video data transmitted from transmitter 4.

Therefore, video signal processing device 11 according to the second modification example is provided with encoder 12 therein (that is, compression encoding is performed as processing of video signal processing device 11) and further includes decoder 29 that decodes the video data compressed and encoded by encoder 12, as illustrated in FIG. 6.

With this configuration, the noise generated by the irreversible compression encoding is stored in first frame memory 22 together with the quantized data via encoder 12 and decoder 29, and thus, it is possible to suppress noise caused by irreversible compression encoding in the video data to be transmitted from transmitter 4.

Second Exemplary Embodiment

Figure 7:
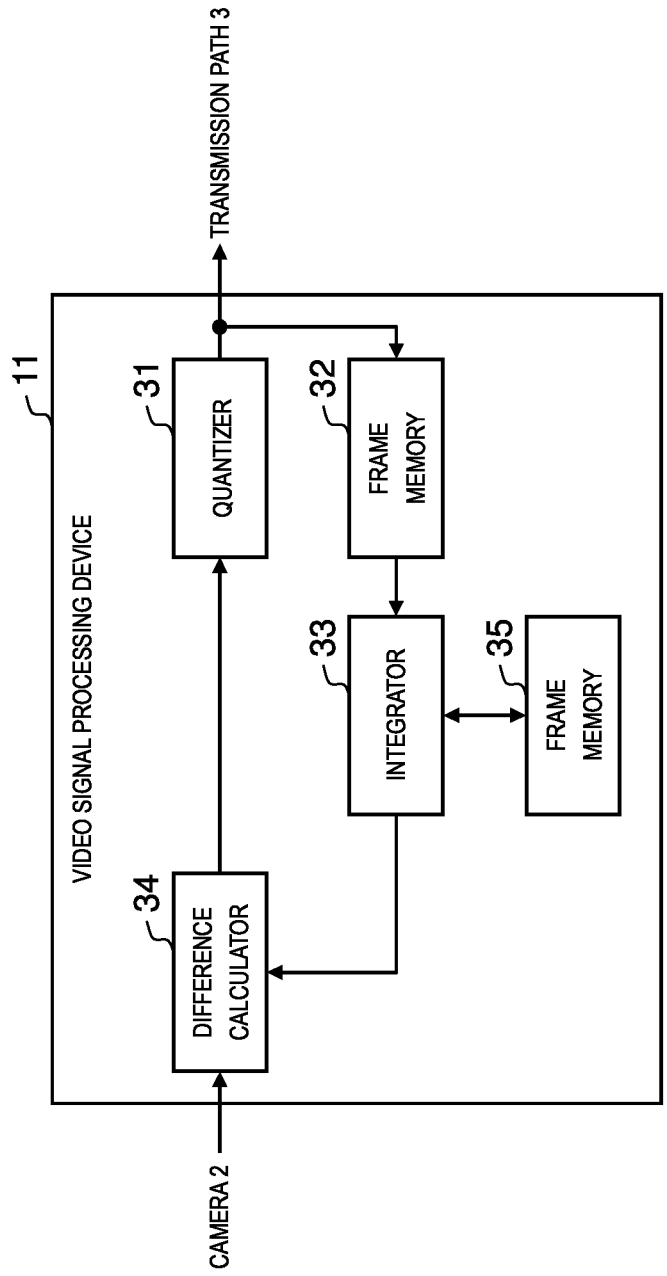
FIG. 7 is a block diagram illustrating a schematic configuration of a video signal processing device of a video display system according to a second exemplary embodiment.
Figure 9:
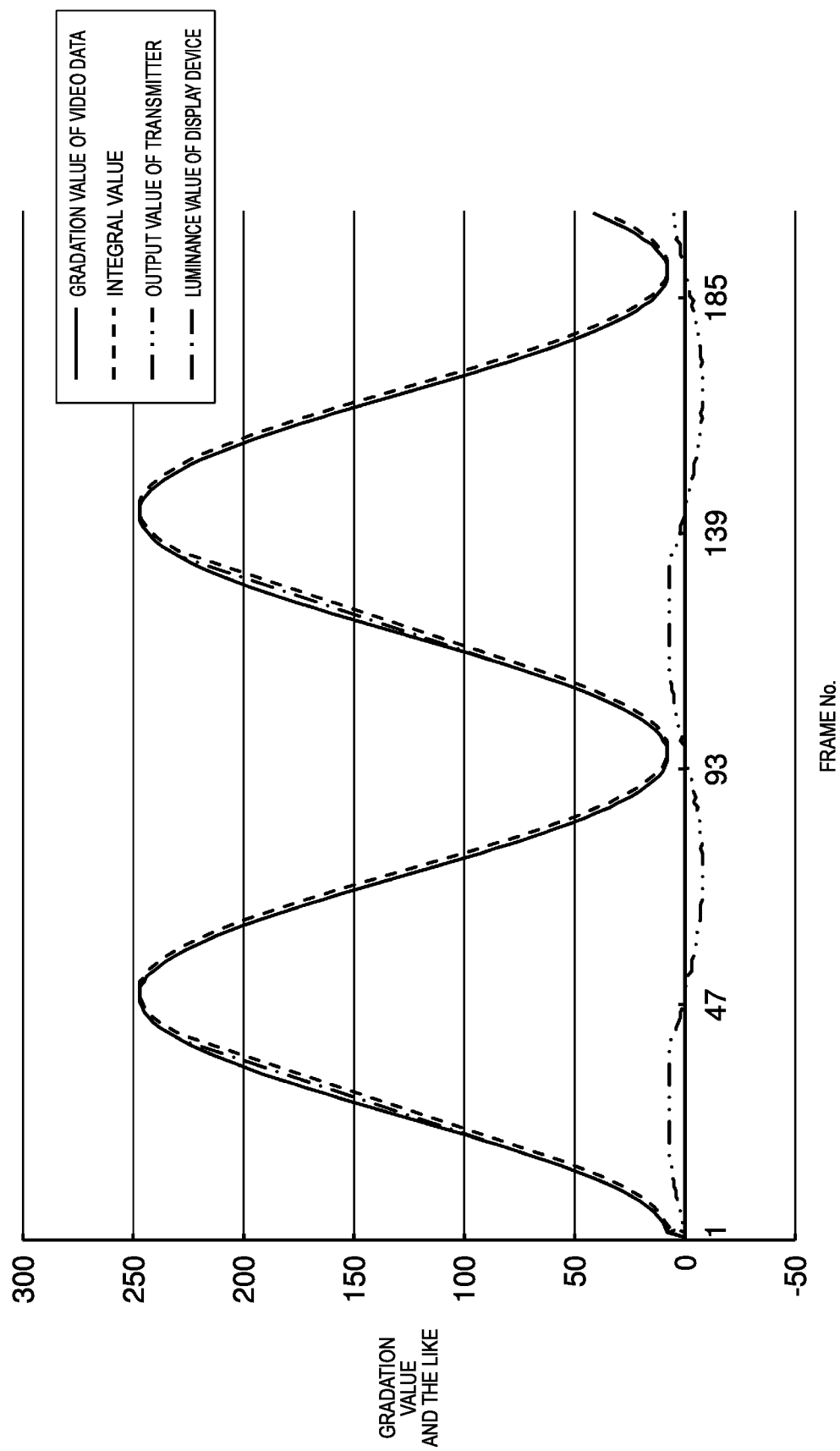
FIG. 9 is an explanatory diagram illustrating the first operation example of the video signal processing device illustrated in FIG. 7.
Figure 11:
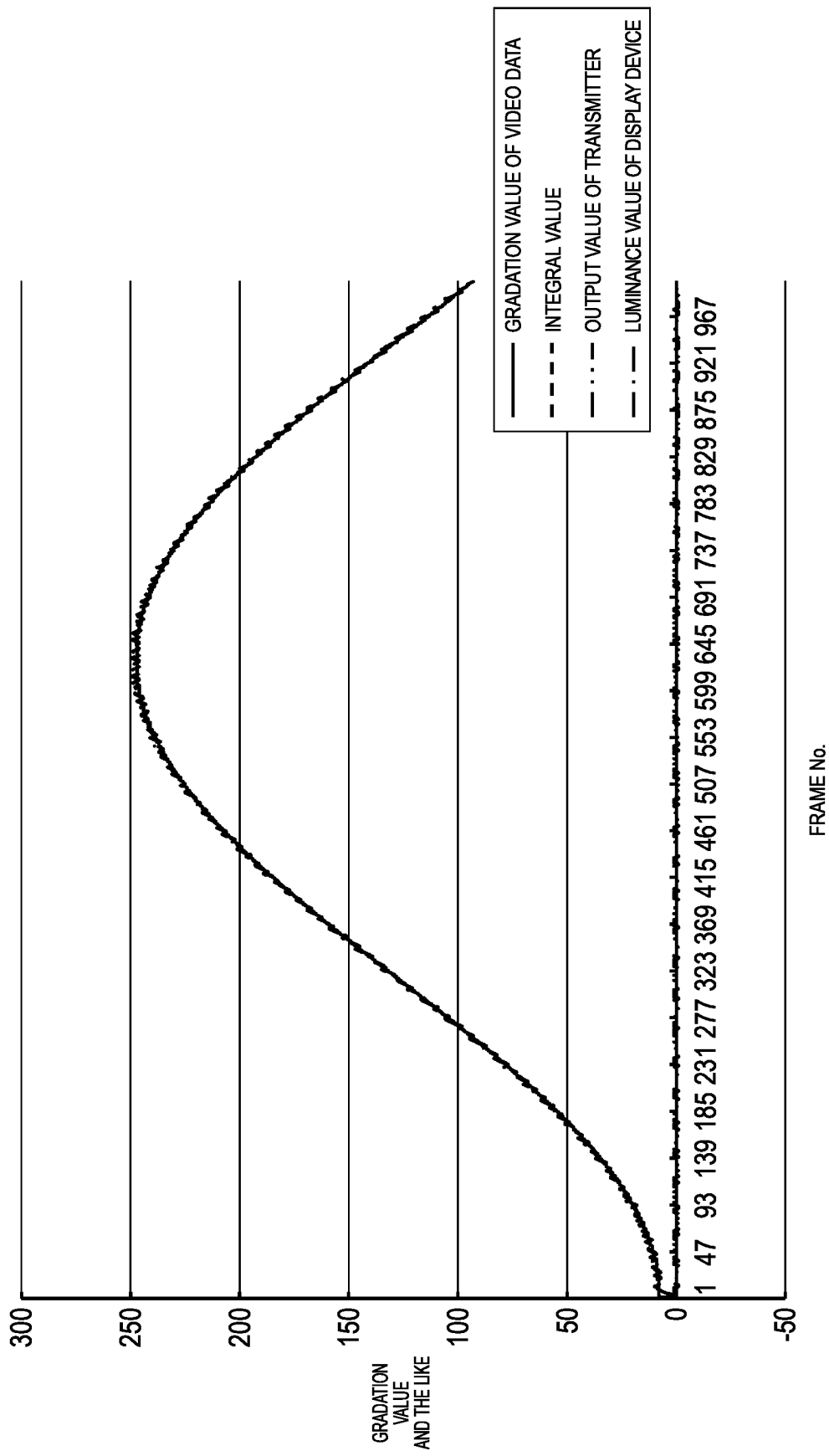
FIG. 11 is an explanatory diagram illustrating the second operation example of the video signal processing device illustrated in FIG. 7.

FIG. 7 is a block diagram illustrating a schematic configuration of video signal processing device 11 of video display system 1 according to a second exemplary embodiment of the present disclosure, FIGS. 8 and 9 are explanatory diagrams (a numerical value example and a graph corresponding thereto) each illustrating a first operation example of video signal processing device 11 according to the second exemplary embodiment, and FIGS. 10 and 11 are explanatory diagrams (a numerical value example and a graph corresponding thereto) each illustrating a second operation example of video signal processing device 11 according to the second exemplary embodiment. Each of FIGS. 8 and 10 illustrates the numerical value example in which a part thereof is omitted. Further, regarding the second exemplary embodiment, items that are not described in particular below are the same as the items of video signal processing device 11 according to the first exemplary embodiment described above, and detailed description thereof will be omitted.

Video signal processing device 11 includes quantizer 31, first frame memory (storage) 32, integrator 33, difference calculator 34, and second frame memory 35.

Quantizer 31 converts data (input data) based on the video data of the first gradation (for example, 8 bits) output from difference calculator 34 into video data of the second gradation (for example, 4 bits) and sequentially output the quantized video data, in the same manner as quantizer 21 described above. The quantized data are sequentially output to transmission path 3 side (here, encoder 12) and are sequentially stored in first frame memory 32 configured by a known memory such as an SDRAM.

Integrator 33 sequentially outputs integral data obtained by sequentially integrating the data stored in first frame memory 32 to difference calculator 34. Further, integral data are sequentially stored in second frame memory 35 configured by the known memory such as the SDRAM and are sequentially read when calculating the next integral data.

Difference calculator 34 sequentially calculates differences between the 8-bit video data of the current frame input from camera 2 and the integral data from integrator 33 and sequentially outputs the difference data as input data of quantizer 31. With this configuration, information on the low 4 bits that are rounded down by the processing of quantizer 31 can be reflected in a subsequent frame by a feedback loop via first frame memory 32, integrator 33, and difference calculator 34.

FIGS. 8 and 9 illustrate a case in which the gradation value of the 8-bit video data (input data) set from 0 to 255 for a predetermined pixel of a frame input at a predetermined time interval (for example, 1 ms) is input from camera 2 to video signal processing device 11 while changing, as the first operation example of video signal processing device 11 according to the second exemplary embodiment. However, the change in the gradation value of the actual video data is not limited to the change illustrated here and can be any change (the same applies to other operation examples which will be described below).

Here, quantizer 31 converts the gradation values of the 8-bit video data into 4-bit video data having gradation values of −8 to 7 and sequentially outputs the converted data. In FIG. 8, for example, in frame No. 1, the gradation value 8 of the video data is input, and 7 based on a difference (that is, a value calculated by difference calculator 34) between the gradation value 8 of the video data and an integral value 0 (an output value from integrator 33) becomes an output value from transmitter 4 (that is, the output value from quantizer 31). Here, when the difference value calculated by difference calculator 34 exceeds 7, the output value from transmitter 4 is set to an upper limit value 7, and when the difference value is less than −8, the output value from transmitter 4 is set to a lower limit value −8 (the same applies hereinafter). Display device 6 receives the output value 7 from transmitter 4 and adds the output value 7 to an initial luminance value 0 (see frame No. 0), and thereby, the luminance value 7 is set for display of a target pixel.

In a subsequent frame No. 2, a gradation value 9 of the video data is input, and 2 based on a value obtained by subtracting the integral value 7 (that is, the sum of the integral value 0 of the frame No. 1 and the output value 7 from transmitter 4) of the frame No. 2 from the gradation value 9 of the video data become the output value from transmitter 4. Display device 6 receives the output value 2 from transmitter 4 and adds the output value to the luminance value 7 (integral value) up to the frame No. 1, and thereby, the luminance value 9 is set for the display of the target pixel.

In a subsequent frame No. 3, a gradation value 10 of the video data is input, and 1 based on a value obtained by subtracting the integral value 9 (that is, the sum of the integral value 7 of the frame No. 2 and the output value 2 from transmitter 4) of the frame No. 3 from the gradation value 10 of the video data becomes the output value from transmitter 4. Display device 6 receives the output value 1 from transmitter 4 and adds the output value to the luminance value 9 (integral value) up to the frame No. 2, and thereby, the luminance value 10 is set for the display of the target pixel. Even in the frames after the frame No. 4, the integral value, the output value from transmitter 4, and the luminance value of display device 6 are respectively set based on the gradation value of the video data to be input in the same manner as described above.

Next, FIGS. 10 and 11 illustrate a case in which the gradation value of the 8-bit video data (input data) set from 0 to 255 for a predetermined pixel of a frame input at a predetermined time interval (for example, 1 ms) is input from camera 2 to video signal processing device 11 while changing, as the second operation example of video signal processing device 11 according to the second exemplary embodiment.

Here, quantizer 31 converts the gradation values of the 8-bit video data into 1-bit video data configured by gradation values of −1 and 1 and sequentially outputs the data. In FIG. 10, for example, a gradation value 8 of the video data is input in the frame No. 1, and 1 based on a difference (that is, the value 8 calculated by difference calculator 34) between the gradation value 8 of the video data and an integral value (the output value from integrator 33) becomes the output value (that is, the output value from quantizer 31) from transmitter 4. Here, when the difference value calculated by difference calculator 34 exceeds 1, the output value from transmitter 4 is set to the upper limit value 1, and when the difference value is less than −1, the output value from transmitter 4 is set to the lower limit value −1 (the same applies hereinafter). Display device 6 receives the output value 1 from transmitter 4 and adds the output value to the initial luminance value 0 (see frame No. 0), and thereby, the luminance value 1 is set for display of a target pixel.

In a subsequent frame No. 2, the gradation value 8 of the video data is input, and 1 based on a value (the difference value is 7) obtained by subtracting the integral value 1 (that is, the sum of the integral value 0 of the frame No. 1 and the output 1 from transmitter 4) of the frame No. 2 from the gradation value 8 of the video data becomes the output value from transmitter 4.

Display device 6 receives the output value 1 from transmitter 4 and adds the output value to the luminance value 2 (integral value) up to the frame No. 1, and thereby, the luminance value 2 is set for the display of the target pixel.

In a subsequent frame No. 3, the gradation value 8 of the video data is input, and 1 based on a value (the difference value is 6) obtained by subtracting the integral value 2 (that is, the sum of the integral value 1 of frame No. 2 and the output value 1 from transmitter 4) of the frame No. 3 from the gradation value 8 of the video data becomes the output value of transmitter 4. Display device 6 receives the output value 1 from transmitter 4 and adds the output value to the luminance value 2 (integral value) up to the frame No. 2, and thereby, the luminance value 3 is set for the display of the target pixel. Even in the frames after the frame No. 4, the integral value, the output value from transmitter 4, and the luminance value of display device 6 are respectively set based on the gradation value of the video data to be input in the same manner as described above.

As such, since video signal processing device 11 according to the second exemplary embodiment is configured to reduce the gradation value of the video data input from camera 2 by quantization and to reflect the information excluded by the quantization in the subsequent frame like video signal processing device 11 according to the first exemplary embodiment described above, via the integral value of integrator 33, when transmitting a video having a relatively high frame rate, it is possible to suppress an increase in the amount of transmission and the amount of calculation of the video while suppressing a decrease in quality of the display image of display device 6 (that is, the gradation value of the video data is matched well with the luminance value of display device 6, and the visual gradation is recovered, as illustrated in FIGS. 9 and 11).

Further, an operation of video signal processing device 11 according to the second exemplary embodiment is similar to $\Delta$ (delta) modulation used for encoding a conventional audio signal, but the $\Delta$ modulation processing on the audio signal improves audio quality by reducing an alias noise that may occur in the quantization of the audio signal, and has a different purpose and effect from the video processing of video signal processing device 11.

Figure 12:
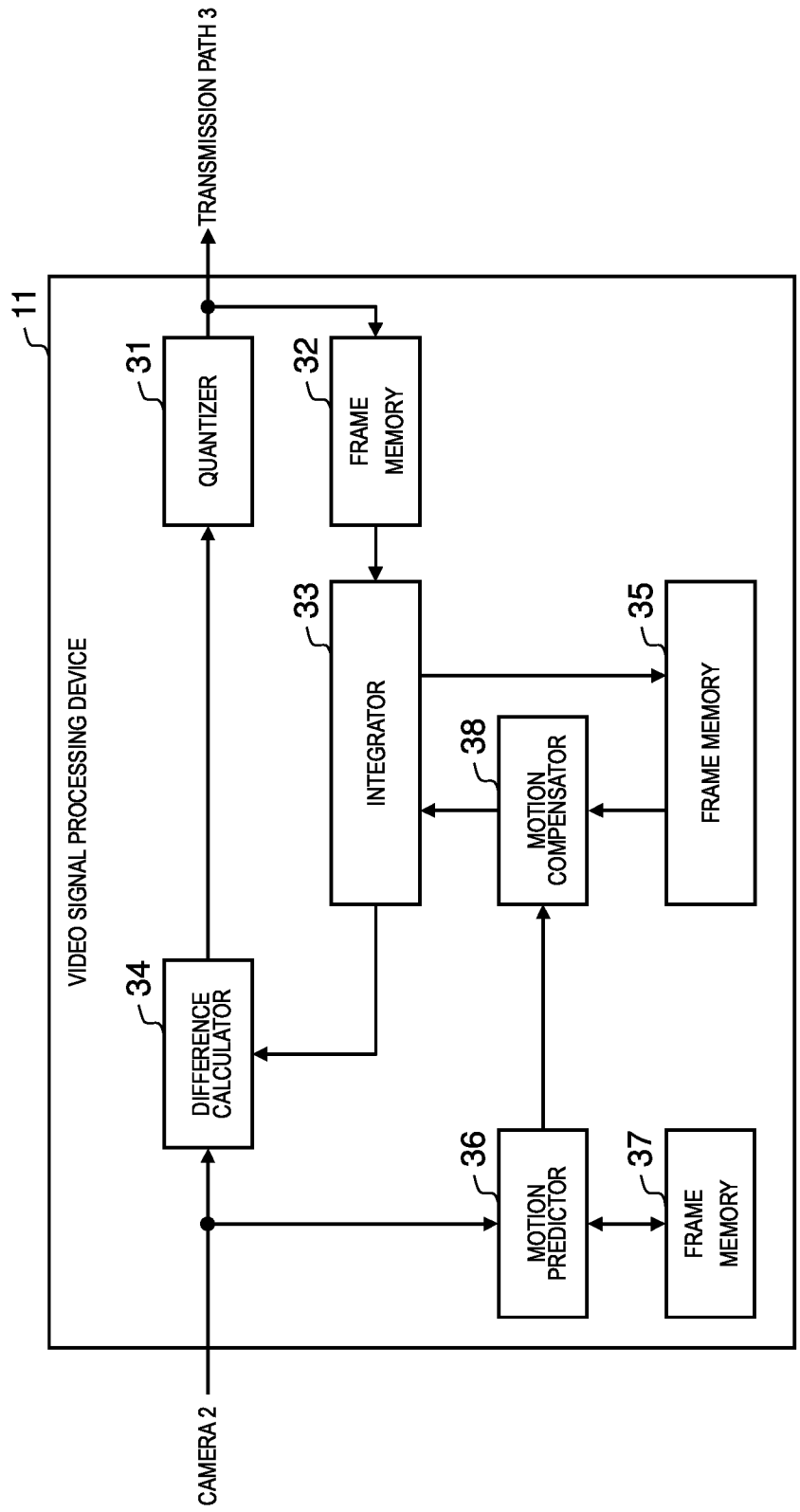
FIG. 12 is a block diagram illustrating a first modification example of the video signal processing device illustrated in FIG. 7.
Figure 13:
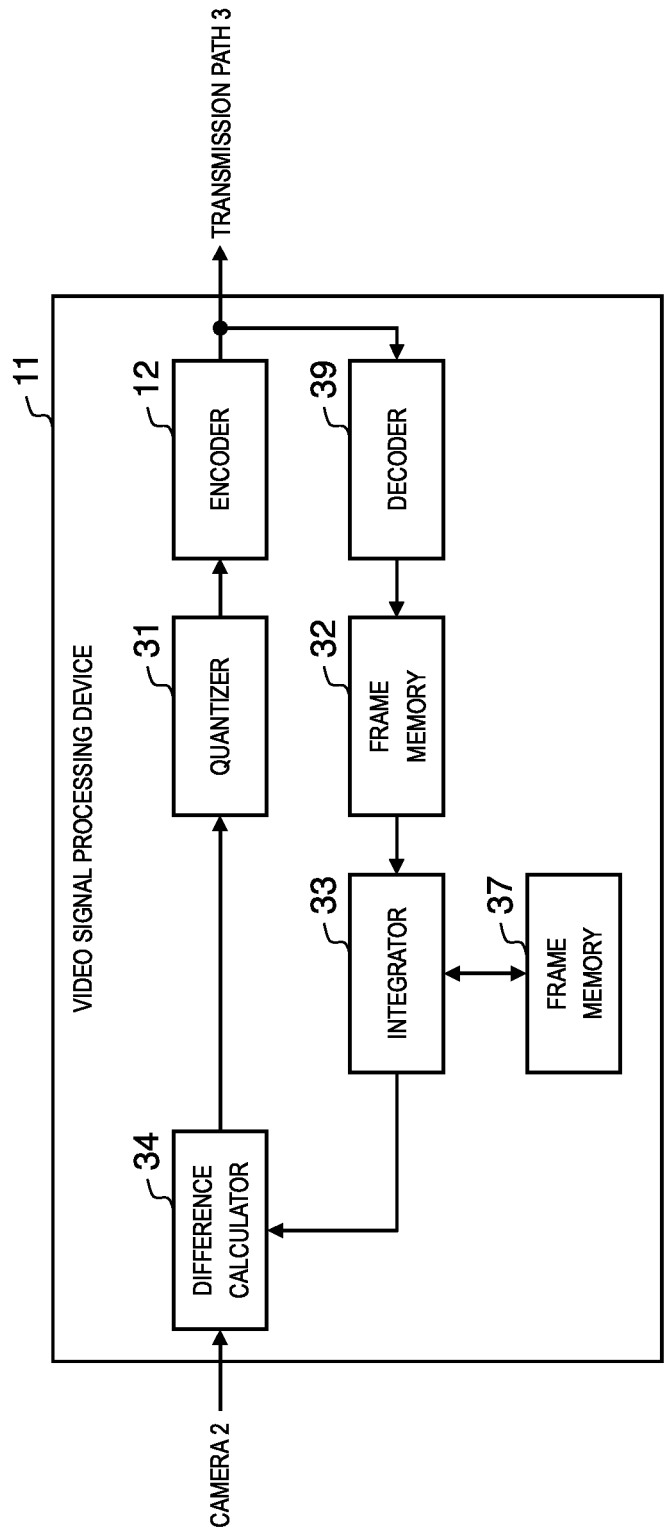
FIG. 13 is a block diagram illustrating a second modification example of the video signal processing device illustrated in FIG. 7.
Figure 14:
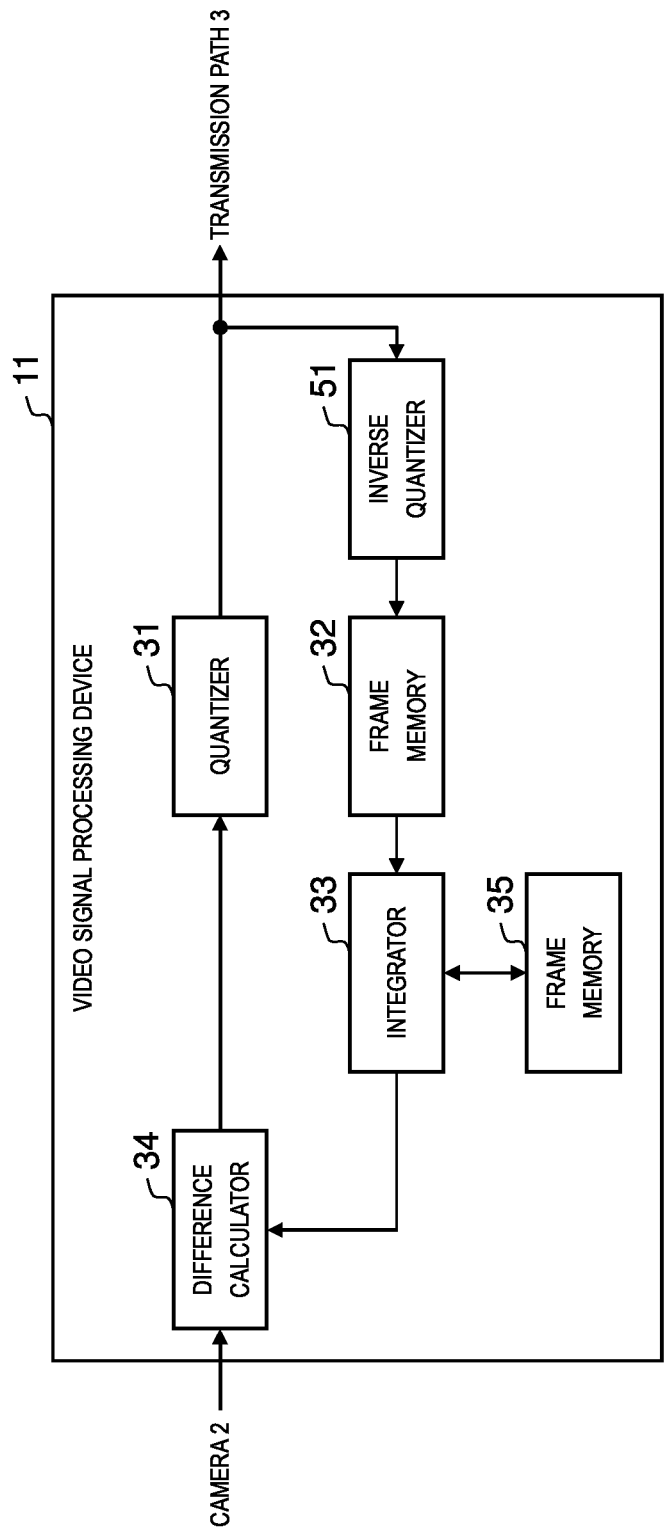
FIG. 14 is a block diagram illustrating a third modification example of the video signal processing device illustrated in FIG. 7.
Figure 16:
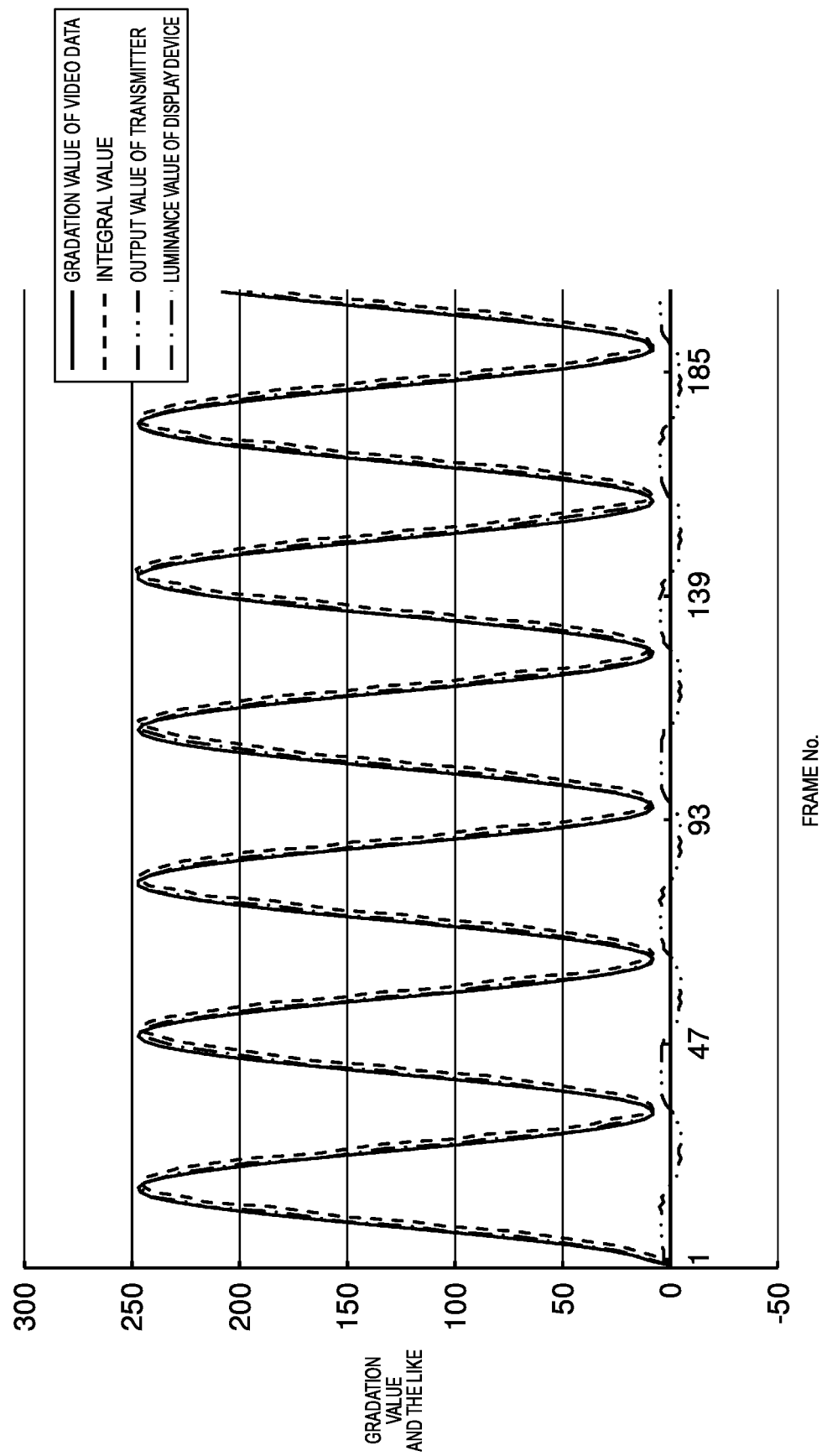
FIG. 16 is an explanatory diagram illustrating the operation example of the video signal processing device illustrated in FIG. 14.

FIGS. 12, 13, and 14 are block diagrams respectively illustrating first, second, and third modification examples of video signal processing device 11 according to the second exemplary embodiment illustrated in FIG. 7, and FIGS. 15 and 16 are explanatory diagrams illustrating an operation example (a numerical value example and a graph corresponding thereto) of video signal processing device 11 according to a third modification example. FIGS. 12 to 14, the same configurations as in video signal processing device 11 illustrated in FIG. 7 are denoted by the same reference numerals. Further, regarding the first to third modification examples, items that are not described in particular below are the same as the items of video signal processing device 11 according to the second exemplary embodiment described above, and detailed description thereof will be omitted.

First Modification Example of Second Exemplary Embodiment

In the same manner as in the case of the first exemplary embodiment described above, video signal processing device 11 according to a first modification example of the second exemplary embodiment further includes motion predictor 36, third frame memory 37, and motion compensator 38 in order to exclude influence of a moving object that may exist in a video, as illustrated in FIG. 12.

The motion predictor 36 sequentially stores the video data of each frame input from camera 2 in third frame memory 37 and calculates a motion vector for each pixel based on a known method such as a block matching method from a difference between the video data of the current frame and the video data of the reference frame.

Motion compensator 38 acquires information on the motion vector calculated by motion predictor 36 and compensates a reading position of each pixel based on the information (motion prediction) on the motion vector when reading the integral data from second frame memory 35.

With this configuration, video signal processing device 11 can appropriately reflect the information (low bit) excluded by quantization of quantizer 31 in a subsequent frame even when a moving object exists in a video.

Second Modification Example of Second Exemplary Embodiment

Further, in the same manner as in the case of the first exemplary embodiment described above, video signal processing device 11 according to a second modification example is provided with encoder 12 therein (that is, compression encoding is performed as processing of video signal processing device 11) and further includes decoder 39 that decodes video data compressed and encoded by encoder 12, as illustrated in FIG. 13.

With this configuration, noise generated by irreversible compression encoding is stored in first frame memory 32 together with the quantized data via encoder 12 and decoder 39, and thus, it is possible to suppress noise caused by the irreversible compression encoding in the video data to be transmitted from transmitter 4.

Third Modification Example of Second Exemplary Embodiment

In video signal processing device 11 according to a third modification example of the second exemplary embodiment, quantizer 31 performs non-linear quantization and, as illustrated in FIG. 14, inverse quantizer 51 that inversely quantizes an output from quantizer 31 is further included therein. The outputs, which are inversely quantized by inverse quantizer 51, from quantizer 31 are sequentially stored in first frame memory 32, in the same manner as video signal processing device 11 according to the second exemplary embodiment described above.

Further, in video display system 1 including video signal processing device 11 according to the third modification example, receiver 5 has a function of sequentially integrating (integrating) video data from transmitter 4 described above and has a function identical to the function of inverse quantizer 51 for inversely quantizing the video data before the integration.

FIG. 15 illustrates a case in which a gradation value of the 8-bit video data (input data) set from 0 to 255 for a predetermined pixel of a frame input at a predetermined time interval (for example, 1 ms) is input from camera 2 to video signal processing device 11 while changing, as an operation example of video signal processing device 11 according to the third modification example of the second exemplary embodiment.

Here, quantizer 31 performs non-linear quantization, thereby, converting the gradation value of the 8-bit video data into 4-bit video data configured by gradation values of −5 to 5 and sequentially outputting the converted data. In FIG. 15, for example, in the frame No. 1, a gradation value 10 of the video data is input, and a difference value 10 (that is, a value calculated by difference calculator 34) based on a difference (that is, the value calculated by difference calculator 34) between a gradation value 10 of the video data and the integral value 0 (the output value from integrator 33) in the frame No. 1 is input to quantizer 31. Therefore, when the difference value is positive, quantizer 31 outputs z logarithm (however, when a numerical value less than 1 is generated, the numerical value is rounded down (the same applies hereinafter)) of the difference value with a base of 2, and when the difference value is negative, quantizer 31 outputs a value obtained by multiplying a logarithm (however, when a numerical value less than 1 is generated, the numerical value is rounded down (the same applies hereinafter)) of an absolute value of the difference value with the base of 2 by −1, and when the difference value is 0, quantizer 31 outputs 0 (the same applies hereinafter). Thereby, in the frame No. 1, the output value from transmitter 4 (that is, the output value from quantizer 31) becomes 3. Here, assuming that the output value from quantizer 31 is "Q", when Q is greater than or equal to 0, inverse quantizer 51 performs inverse quantization by raising 2 to the Qth power, and when Q is negative, inverse quantizer 51 performs the inverse quantization by raising 2 to the −Qth power (the same applies hereinafter). Thereby, in the frame No. 1, the output value from inverse quantizer 51 becomes 8 (2 to the third power). Further, receiver 5 that has receives the output value from transmitter 4 relating to 1 calculates the inverse quantization value 8 in the same manner as inverse quantizer 51, and furthermore, display device 6 sets the inverse quantization value 8 for display of a target pixel by adding the inverse quantization value 8 to the initial luminance value 0 (see frame No. 0).

In a subsequent frame No. 2, a gradation value 17 of the video data is input, and a difference value 9 based on a difference between the gradation value 17 of the video data and an integral value 8 (the sum of an integral value 0 of the frame No. 1 and the inverse quantization value 8) in the frame No. 2 is input to quantizer 31. Thereby, in the frame No. 2, the output value from transmitter 4 (quantizer 31) becomes 3. Further, in the frame No. 2, the output value from inverse quantizer 51 becomes 8. Furthermore, regarding the frame No. 2, display device 6 sets the luminance value 8 for the display of the target pixel by adding the inverse quantization value 16 to the luminance value 8 (integral value) in the frame No. 1.

In a subsequent frame No. 3, a gradation value 28 of the video data is input, and a difference value 12 based on a difference between the gradation value 28 of this video data and the integral value 16 (the sum of the integral value 8 of the frame No. 2 and the inverse quantization value 8) in the frame No. 3 is input to quantizer 31. Thereby, in the frame No. 3, the output value from transmitter 4 (quantizer 31) becomes 3. Further, in the frame No. 3, the output value from inverse quantizer 51 becomes 8. Furthermore, regarding the frame No. 3, display device 6 sets a luminance value 24 for the display of the target pixel by adding the inverse quantization value 8 to the luminance value 16 up to the frame No. 2. Even in the frames after the frame No. 4, the integral value, the difference, the output value from transmitter 4, and the luminance value of display device 6 are respectively set based on the gradation value of the video data to be input in the same manner as described above.

As such, since video signal processing device 11 according to a third modification example of the second exemplary embodiment is configured to reduce the gradation of the video data input from camera 2 by quantization and to reflect the information excluded by the quantization in the subsequent frame like video signal processing device 11 according to the first exemplary embodiment described above, when transmitting a video having a relatively high frame rate, it is possible to suppress an increase in the amount of transmission and the amount of calculation of the video while suppressing a decrease in quality of the display image of display device 6 (that is, while recovering a visual gradation by matching the gradation value of the video data with the luminance value of display device 6 well, as illustrated in FIG. 16).

Particularly, since video signal processing device 11 according to the third modification example of the second exemplary embodiment performs non-linear quantization, when variation of the video data input from camera 2 is relatively large (when the video data has a high frequency), there is an advantage that smooth processing can be performed as compared with a case in which the above-described linear quantization is performed.

Third Exemplary Embodiment

Figure 17:
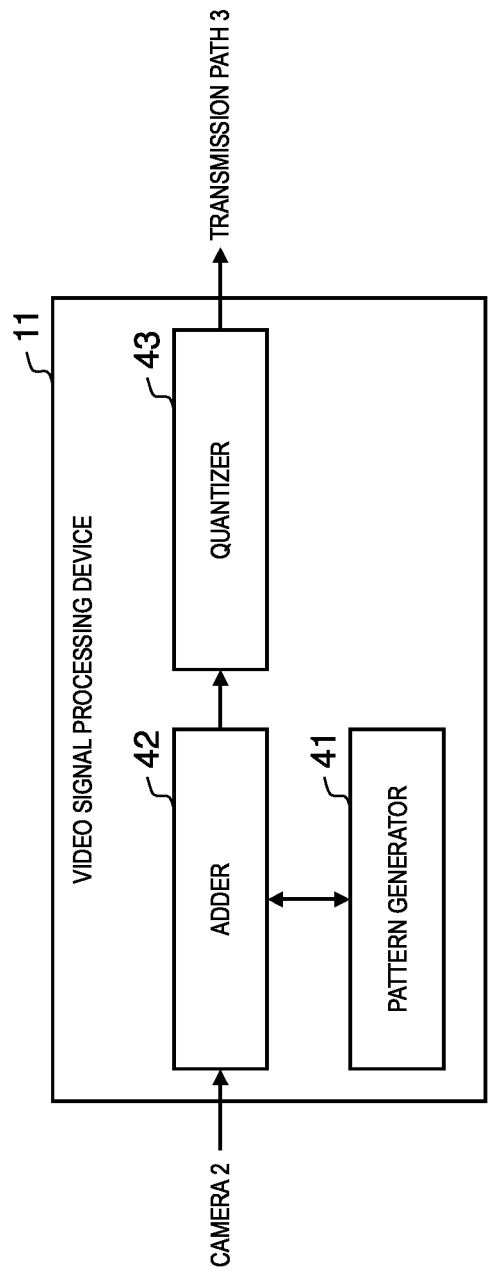
FIG. 17 is a block diagram illustrating a schematic configuration of a video signal processing device of a video display system according to a third exemplary embodiment.

FIG. 17 is a block diagram illustrating a schematic configuration of video signal processing device 11 in video display system 1 according to the third exemplary embodiment of the present disclosure, and FIGS. 18 and 19 are explanatory diagrams respectively illustrating first and second operation examples of video signal processing device 11 according to the third exemplary embodiment. Regarding the third exemplary embodiment, items that are not described in particular below are the same as the items of video signal processing device 11 according to the first or second exemplary embodiment described above, and detailed description thereof will be omitted.

Video signal processing device 11 includes pattern generator 41, adder 42, and quantizer 43.

Pattern generator 41 sequentially generates variation value data, statistically or stochastically, having a smaller bit number (for example, 4 bits) than the bit number of the video data of the first gradation input from camera 2, and outputs the variation value data to adder 42. The variation value data can be generated by using, for example, a random number or a triangular wave.

Adder 42 generates data by adding 8-bit video data and the variation value data for the current frame sequentially input from camera 2 and outputs the data to quantizer 43.

Quantizer 43 can generate data (quantized data) of which gradation is reduced by quantizing the data output from adder 42 into video data of the second gradation (for example, 4 bits), like quantizer 21 described above.

FIG. 18 illustrates a case in which each gradation value of 8-bit video data (input data) set from 0 to 240 is input from camera 2 to video signal processing device 11 at a predetermined time interval (for example, 1 ms), as the first operation example of video signal processing device 11 according to the third exemplary embodiment. At this time, pattern generator 41 sequentially generates variation values 0 to 15 (variation value data) by using a triangular wave, and thereby, adder 42 generates data by adding the 8-bit video data to the variation values and outputs the added data to quantizer 43. Further, quantizer 43 converts the gradation values of the 8-bit video data from adder 42 into 4-bit video data configured by gradation values of 0 to 15 and sequentially outputs the video data.

For the variation value 0, an 8-bit gradation value 240 is converted into a 4-bit gradation value 15 (however, is rounded down when a numerical value less than 1 is generated (the same applied hereinafter)) obtained by dividing a value obtained by adding the variation value 0 thereto by 16, and an 8-bit gradation value 239 is converted into a 4-bit gradation value 14 obtained by dividing a value obtained by adding the variation value 0 thereto by 16, and an 8-bit gradation value is converted into a 4-bit gradation value even after that in the same manner as described above. Further, for the variation value 1, the 8-bit gradation value (luminance value of a video) 240 of the video data is converted into a 4-bit gradation value 15 obtained by dividing a value obtained by adding the variation value 1 thereto by 16, and an 8-bit gradation value 239 is converted into a 4-bit gradation value 14 obtained by dividing a value obtained by adding the variation value 1 thereto by 16, and the 8-bit gradation value is converted into the 4-bit gradation value even after that in the same manner as described above. Further, for variation values 2 to 15, an 8-bit gradation value of the video data is converted into a 4-bit gradation value 14 in the same manner as described above.

FIG. 19 illustrates a case in which each gradation value of 8-bit video data (input data) set from 0 to 240 is input from camera 2 to video signal processing device 11 at a predetermined time interval (for example, 1 ms), as the second operation example of video signal processing device 11 according to a third exemplary embodiment. At this time, pattern generator 41 sequentially generates variation values 0 to 15 (variation value data) using random numbers, and thereby, adder 42 generates data obtained by adding the 8-bit video data and the variation values and outputs the data to quantizer 43. Further, quantizer 43 converts the gradation value of the 8-bit video data from adder 42 into 4-bit video data configured by gradation values of 0 to 15 and sequentially outputs the data.

For the variation value 0, an 8-bit gradation value 240 is converted into a 4-bit gradation value 15 (however, is rounded down when a value less than 1 is generated) obtained by dividing a value obtained by adding the variation value 0 thereto by 16, and an 8-bit gradation value 239 is converted into a 4-bit gradation value 14 obtained by dividing a value obtained by adding the variation value 0 thereto by 16, and the 8-bit gradation value is converted into the 4-bit gradation value even after that in the same manner as described above. Further, for the variation value 15, an 8-bit gradation value (luminance value of a video) 240 of the video data is converted into a 4-bit gradation value 15 obtained by dividing a value obtained by adding the variation value 15 thereto by 16, and the 8-bit gradation value 239 is converted into the 4-bit gradation value 15 obtained by dividing a value obtained by adding the variation value 15 thereto by 16, and the 8-bit gradation value is converted into the 4-bit gradation value even after that in the same manner as described above. Further, the 8-bit gradation value of the video data is converted into the 4-bit gradation value 14 even for other variation values in the same manner as described above.

Here, it is assumed that the 8-bit gradation value is referred to as an "original gradation value", and the 4-bit gradation value is referred to as a "variation gradation value". For example, when an original gradation value 101 is output in a certain frame, a variation gradation value 6 is output 11 times and a variation gradation value 7 is output five times. That is, 101=6×11+7×5, and although the 4-bit gradation is output, it is possible to make it look as if the 8-bit gradation is displayed by changing the variable gradation value as needed within 16 frames.

With this configuration, video signal processing device 11 according to the third exemplary embodiment is configured to reduce the gradation of the video data input from camera 2 by quantization and to reflect the information excluded by the quantization as the variation value data to be replaced, and thus, when a video having a relatively high frame rate is transmitted, it is possible to suppress an increase in the amount of transmission and the amount of calculation of a video while suppressing a decrease in quality of the displayed video.

As described above, although the present disclosure is described based on the specific exemplary embodiments, the exemplary embodiments are merely examples, and the present disclosure is not limited to the exemplary embodiments. Each configuration element of the video signal processing device, the video display system, and the video signal processing method according to the present disclosure described in the above exemplary embodiments is not necessarily indispensable and can be appropriately selected without departing from at least the scope of the present disclosure.

INDUSTRIAL APPLICABILITY

A video signal processing device, a video display system, and a video signal processing method according to the present disclosure can suppress a decrease in quality of a displayed video and suppress an increases in the amount of transmission and the amount of calculation of a video while maintaining low-delay transmission utilizing a high frame rate, when transmitting a video (for example, a video having a frame rate exceeding 60 fps) having a relatively high frame rate, and are useful as a video signal processing device, a video display system, and a video signal processing method suitable for a video having a relatively high frame rate.

REFERENCE MARKS IN THE DRAWINGS

1 VIDEO DISPLAY SYSTEM
2 CAMERA (IMAGING DEVICE)
3 TRANSMISSION PATH
4 TRANSMITTER
5 RECEIVER
6 DISPLAY DEVICE
11 VIDEO SIGNAL PROCESSING DEVICE
12 ENCODER
13 DECODING CIRCUIT
21 QUANTIZER
22 FIRST FRAME MEMORY (STORAGE)
23 DIFFERENCE CALCULATOR
24 INTEGRATOR
25 SECOND FRAME MEMORY
26 MOTION PREDICTOR
27 THIRD FRAME MEMORY
28 MOTION COMPENSATOR
29 DECODER
31 QUANTIZER
32 FIRST FRAME MEMORY (STORAGE)
33 INTEGRATOR
34 DIFFERENCE CALCULATOR
35 SECOND FRAME MEMORY
36 MOTION PREDICTOR
37 THIRD FRAME MEMORY
38 MOTION COMPENSATOR
39 DECODER
41 PATTERN GENERATOR
42 ADDER
43 QUANTIZER
51 INVERSE QUANTIZER

The invention claimed is:

1. A video signal processing device that outputs video data of a second gradation having a second bit number smaller than a first bit number by encoding input video data of a first gradation having a first bit number, the video signal processing device comprising:
a processor; and a memory including instructions that, when executed by the processor, causes the processor to perform operations, the operations including:
  receiving first video data of the first gradation for a current frame, the current frame being captured at a first time;
  quantizing the first video data of the first gradation to obtain first quantized video data of the second gradation for the current frame;
  calculating first difference data as a difference between the first video data of the first gradation for the current frame and second quantized data for a previous frame stored by the processor, the previous frame being captured at a second time, the second time being before the first time;
  outputting the first quantized video data;
  storing, for reflection in a subsequent frame as a superimposed afterimage, integral data, the integral data being obtained by integrating the first difference data and second difference data, the second difference data being calculated based on second video data of the first gradation for the previous frame;
  reflecting, in the subsequent frame as the superimposed afterimage, data of the first video data of the first gradation which is discarded during the quantizing of the first video data, the subsequent frame being captured at a third time, the third time being after the first time; and
  repeating the receiving, the quantizing, the calculating, the outputting, the storing, and the reflecting for at least one next frame received subsequent to the current frame, whereby the integral data is sequentially obtained and stored for each of the at least one next frame,
wherein, in the repeating, the integral data which is sequentially obtained and stored for each of the at least one next frame is cumulative and includes a summation of difference data for each prior frame.

2. The video signal processing device of claim 1, the operations further including:
  calculating a motion vector between the first video data of the first gradation for the current frame and the second video data of the first gradation for the previous frame; and
  correcting the integral data based on the motion vector.

3. The video signal processing device of claim 1, the operations further including:
  compressing and encoding the first quantized video data output by the processor; and
  decoding the first quantized video data output by the processor,
  wherein the processor sequentially stores the first quantized video data decoded by the processor.

4. The video signal processing device according to claim 1, wherein a frame rate for the first video data of the first gradation is higher than 60 fps.

5. A video display system comprising:
  the video signal processing device according to claim 1;
  an imaging device that generates the first video data of the first gradation having the first bit number;
  a decoding circuit that receives the first quantized video data of the second gradation output from the video signal processing device and decodes the received first quantized video data of the second gradation; and
  a display device that displays a video based on the first quantized video data of the second gradation decoded by the decoding circuit.

6. A video signal processing device that outputs video data of a second gradation having a second bit number smaller than a first bit number by encoding input video data of a first gradation having a first bit number, the video signal processing device comprising:
  a processor; and
  a memory including instructions that, when executed by the processor, causes the processor to perform operations, the operations including:
    receiving first video data of the first gradation for a first frame, the first frame being captured at a first time;
    quantizing the first video data of the first gradation to obtain first quantized video data of the second gradation for the first frame;
    calculating first difference data as a difference between the first video data of the first gradation for the first frame and second quantized data of the second gradation for a second frame, the second frame being captured at a second time and immediately preceding the first frame, and second video data of the first gradation for the second frame being received for the second frame and quantized to obtain the second quantized data of the second gradation for the second frame;
    generating integral data by integrating the first difference data and second difference data, the second difference data being calculated based on the second video data of the first gradation for the second frame;
    outputting the first quantized video data of the second gradation for the first frame;
    storing, for reflection in a subsequent frame as a superimposed afterimage, the integral data;
    reflecting, in the subsequent frame as the superimposed afterimage, data of the first video data of the first gradation which is discarded during the quantizing of the first video data, the subsequent frame being captured at a third time, the third time being after the first time; and
    repeating the receiving, the quantizing, the calculating, the generating, the outputting, the storing, and the reflecting for at least one frame received subsequent to the first frame, whereby the integral data is sequentially generated and output for each of the at least one frame,
  wherein, in the repeating, the integral data which is sequentially obtained and stored for each of the at least one frame received subsequent to the first frame is cumulative and includes a summation of difference data for each prior frame.

7. The video signal processing device of claim 6, the operations further including:
  calculating a motion vector between the first video data of the first gradation for the first frame and the second video data of the first gradation for the second frame; and
  correcting the integral data based on the motion vector.

8. The video signal processing device of claim 6, the operations further including:
  compressing and encoding the first quantized video data output by the processor; and
  decoding the first quantized video data output by the processor,
  wherein the processor sequentially stores the first quantized video data decoded by the processor.

9. The video signal processing device according to claim 6, wherein a frame rate for the first video data of the first gradation is higher than 60 fps.

10. A video display system comprising:
the video signal processing device according to claim 6;
an imaging device that generates the first video data of the first gradation having the first bit number;
a decoding circuit that receives the first quantized video data of the second gradation output from the video signal processing device and decodes the received first quantized video data of the second gradation; and
a display device that displays a video based on the first quantized video data of the second gradation decoded by the decoding circuit.

* * * * *